United States Patent [19]
Levinson

[11] Patent Number: 6,047,260
[45] Date of Patent: Apr. 4, 2000

[54] INTELLIGENT PLANNING AND CALENDARING SYSTEM WITH CUEING FEATURE AND FLOATING TASKS

[75] Inventor: Richard J. Levinson, Palo Alto, Calif.

[73] Assignee: Attention Control Systems, Inc., Mountain View, Calif.

[21] Appl. No.: 08/869,504

[22] Filed: Jun. 5, 1997

[51] Int. Cl.[7] .................................................. G06F 17/00
[52] U.S. Cl. .................................................. 705/9; 705/8
[58] Field of Search .............................................. 705/8, 9

[56] References Cited

U.S. PATENT DOCUMENTS

| | | | |
|---|---|---|---|
| 5,050,077 | 9/1991 | Vincent | 705/8 |
| 5,233,533 | 8/1993 | Edstrom et al. | 364/468.09 |
| 5,241,465 | 8/1993 | Oba et al. | 705/8 |
| 5,519,606 | 5/1996 | Frid-Nielsen et al. | 705/9 |

(List continued on next page.)

OTHER PUBLICATIONS

Kay, Emily. "Juggling priorities from the desktop." MacWeek, v. 2, n. 49, p. 46, Dec. 6, 1988 [retrieved from DIALOG file 275].

Haskin, David. "Making contact with words." Computer Shopper, v. 15, n. 7, p. 455, Jul. 1995 [retrieved from DIALOG file 275].

Torgan, Emerson Andrew. "Info at your fingertips." Home Office Computing, v. 13, n. 7, p. 78, Jul. 1995 [retrieved from DIALOG file 275].

Gilliland, Steve. "Schedule It coordinates with your users." Computer Shopper, v. 16, n. 5, p. 632, May 1996 [retrieved from DIALOG file 275].

Levinson, Richard; "The Planning and Execution Assistant and Trainer (PEAT)", The Journal of Head Trauma Rehabilitation, Apr. 1997.

Moore, Mark; "Vendors Outfit Handheld Organizers with PC Links," PC Week, v 13, n35, p27, Sep. 1996.

Leyenberger, Arthur; "Palm Pilot (Abstract)," PC Laptop Computers Magazine, v8, n7, p24, Jul. 1996.

Drummond, Mark, et al.; "Reaction–First," Proceedings of International Joint Conference on Artificial Intelligence, Chamberey, France, Sep. 1993.

Levinson, Richard, et al.; "Integrated Perception, Planning and Control for Autonomous Soil Analysis," Ninth Conference on Artificial Intelligence for Applications, Mar. 1993.

Levinson, R., Human Frontal Lobes and AI Planning Systems, NASA Ames Research Center, From the 2nd AI Planning Systems Conference, 1994.

Levinson, R., A Computer Model of Prefrontal Cortex Function, NASA Ames Research Center, The Annals of the New York Academy of Sciences, Structure and Function of the Human Prefrontal Cortex, vol. #769, 1995.

(List continued on next page.)

Primary Examiner—Allen R. MacDonald
Assistant Examiner—Michele Stuckey Crecca
Attorney, Agent, or Firm—Gray Cary Ware & Freidenrich LLP

[57] ABSTRACT

A method for intelligently planning is provided, comprising the steps of receiving a plurality of tasks that a user needs to perform, each task having an earliest start time, a latest stop time, a duration for completing the event and a reward value for completing the event, the tasks including a fixed task having the duration being equal to the time period between the earliest start time and the latest stop time and a floating task having a duration that is less than the time period between the earliest start time and the latest stop time, arranging said fixed task into a plan for the user based on the earliest start time, duration and reward of the fixed task, determining an actual start time for the floating task within the time period between the earliest start time and the latest stop time based on the earliest start time and duration of the fixed task, and arranging said floating task into the plan for the user based on the selected actual start time and the reward of the floating task. A system for intelligently planning a series of events into a plan is also provided.

29 Claims, 13 Drawing Sheets

U.S. PATENT DOCUMENTS

| | | | |
|---|---|---|---|
| 5,623,404 | 4/1997 | Collins et al. | 705/9 |
| 5,692,125 | 11/1997 | Schloss et al. | 705/9 |
| 5,732,399 | 3/1998 | Katiyar et al. | 705/8 |
| 5,737,728 | 4/1998 | Sisley et al. | 705/8 |
| 5,748,907 | 5/1998 | Crane | 705/2 |
| 5,774,867 | 6/1998 | Fitzpatrick et al. | 705/9 |
| 5,778,346 | 7/1998 | Frid-Nielsen et al. | 705/9 |
| 5,895,451 | 4/1999 | Yamade et al. | 705/8 |
| 5,907,829 | 5/1999 | Kida | 705/9 |
| 5,943,652 | 8/1999 | Sisley et al. | 705/9 |

OTHER PUBLICATIONS

Levinson, R., A general programming language for unified planning and control, Artificial Intelligence 76 (1995) 319–375.

12:50 p Tues Mar 30 | Name
*Safeway* | Delete
Phone: 415-555-9007 | Return
Address: 650 Castro Street
Mountain View, CA 94041
Directions:
START | 12:50 PM

12:50 p Tues Mar 30 | Find | 354
Keyword: | Word
Safeway | Date
Find it | Return
START | 12:50 PM

? Datebook ◄ Tuesday, Oct. 15, 1966 ► | Desk
7...8...9...10...11...12...1...2...3...4...5...6...7...8...9
AM — PM
+ new
8 a.m. — Morning Routine
-8:45
1 today
8:05 a.m. — Call Doctor
-8:15 a.m.
week
month
year
Start Planning

INTELLIGENT PLANNING AND CALENDARING SYSTEM WITH CUEING FEATURE AND FLOATING TASKS

BACKGROUND OF THE INVENTION

This invention relates generally to a calendaring system and method for reminding a user of upcoming tasks and appointments and for automatically planning a user's calendar based on inputted tasks and goals of a user and cueing the user at the beginning and end of a task or appointment.

Professional and personal success depends heavily on the ability to integrate planning and execution of a routine series of steps, known as scripts, into a daily schedule. In many situations, many scripts may need to be coordinated simultaneously which may produce unexpected conflicts between the scripts. Success may also depend on the flexibility to modify previously determined scripts to accommodate changing goals and conditions and the ability to execute a planned series of events despite surprises. To respond to a surprise or deal with limited time, a person must plan and replan their schedule.

In the context of a running business, a successful product introduction to the market requires the integration of planning (selecting resources and operations), scheduling (selecting start and stop times for events), and execution of the plan. The execution of the plan may involve performing operations, monitoring for unexpected events and adjusting the plan in response to the unexpected events. There is a need to link each of these functions together to achieve success and solve dynamic planning problems caused by surprises. No products currently exist which integrate all of these functions.

Current scheduling and project management tools lack some of the functions necessary to perform dynamic planning. For example, current project management tools assume that the set of tasks to be scheduled does not change and the tool cannot automatically add or replace tasks in the schedule to replan the schedule. As another example, most scheduling systems may determine one possible solution to a scheduling problem, but will not try other possible solutions and determine the best solution based on a user's goals.

There is also little overlap between features found in calendaring systems and those found in project management tools. Most calendar systems do not provide the user with an ability to break down an appointment or a to-do item into tasks. Most project management tools do not provide any system for transforming the project goals into appointments that are scheduled. Thus, currently a user must use both a calendaring system and a project management tool in order to achieve scheduling and execution of a plan. These combined systems, however, still do not provide automatic planning. Thus, there is a need for dynamic and flexible calendar systems to remind busy people about important events (including tasks or appointments), There is also a need to assist people with cognitive disorders to help them remember the tasks that they are supposed to be doing during a day. In particular, there is a need for a system that may be customized to a particular user and a particular user's abilities. The cognitive disorders that may be aided by such a system may be caused by a variety of injuries or diseases, including but not limited to brain injuries, Alzheimer's Dementia, stroke, tumor, electrocution, lack of oxygen, and multiple sclerosis. The number of people with cognitive disorders is very large and may be on the order of six million people in the United States. The average lifetime cost to care for a single person with a brain injury is on the order of four to nine millions dollars. The average annual cost to care for a person with Alzheimer's disease is forty-seven thousand dollars and the total money being spent for care in the United States is about one hundred billion dollars. These costs are high because a person with a cognitive disorder requires constant care to help them perform daily tasks and therefore it is desirable to provide a system which reduces these large expenditures by helping these people with cognitive disorders to plan their schedules and remind them of tasks and appointments.

The universal goal of therapy, for people with cognitive disorders, is increased independence and autonomy and achieving these goals requires planning which may be difficult for a person with a cognitive disorder. With such planning impairments, people with cognitive disorders lose much of their independence and their quality of life is reduced.

A typical person may have attention lapses in which they take the wrong exit off of a freeway because they are distracted or a telephone call may distract the person from making a dinner and the dinner burns or they may be in a hurry and forget to pack an important item for a trip. For a person with a cognitive disorder, these attention lapses occur all the time. In addition, the brain functions necessary to detect and correct such attention lapses are also damaged in a person with a cognitive disorder. These cognitive disorders affect the family of the person because the family must take care of the person.

People with cognitive disorders are typically unable to remember simple tasks or sequences of tasks, may be easily distracted from a certain task, or may be so focused on a task that they forget about other events. Thus, there is a need for a system to help people with cognitive disorders to stay focused and to complete tasks despite surprises, distractions, and unexpected events or changes to the user's schedule. Moreover, because many of the people with cognitive disorders have a dysfunctional frontal lobe of their brain that normally performs planning, these people may have difficulty planning a schedule of events for an entire day, or dynamically readjusting a schedule to handle unexpected events. For example, a user with a severe cognitive disorder may require cueing in order to get up, shower, and make breakfast. Family members of the person with the cognitive disorder may give up their free time to take on the role of a caregiver and give reminders to the person. It is therefore desirable to provide an automatic system for calendaring events and dates that may also cue the user through a series discrete steps. It is also desirable to provide a system which may plan a user's schedule based on a plurality of events, detect any conflicts in a user's schedule, and resolve any conflicts with minimum user input.

A large number of paper and electronic calendaring systems that record events and appointments are available currently. Typical electronic calendaring systems provide some ability to add daily events and may provide some reminder to a user that a particular event is about to occur. These typical calendaring systems may also permit the user to change his appointments and may indicate to the user that a conflict between events is going to occur. In the event of a conflict, a user must think about how to reschedule his calendar in light of the conflict. Thus, although these calendaring systems provide some minimal scheduling ability, none of these typical calendaring systems provide a planning capability which may predict the effects of different event/action sequences, compare those predictions to a set of specified goals and select the actions/events that maximize goal achievements.

Planning differs from typical scheduling. Scheduling involves finding a proper order for a given set of tasks, while planning involves determining and selecting those tasks that need to be scheduled based on some criteria, such as the goals, preferences or priorities of a user. A person with a malfunctioning frontal lobe of his brain cannot plan the events and they require a planning system to plan events for them. It is also desirable to provide these people with some system for reminding them of upcoming events and prompting them to complete tasks and stay focused. There are few typical systems that are designed to help people with cognitive disorders, but these systems also do not provide any planning ability because they rely on a caregiver to plan a user's schedule. These systems also have other limitations that further diminish their utility to people with cognitive disorders.

One typical calendaring system designed to be used by people with cognitive disorders comprises a laptop computer system with a simplified user interface that permits people with cognitive disorders to manage information, such as schedules, budgets, personal contacts, to-do lists and school work. This system provides pre-programmed routines (i.e., a series of steps) for specific tasks, such as paying bills or doing schoolwork. This system may provide some cueing to the user, such as a button on the screen that must be depressed, to indicate the beginning of a particular task. This system may provide some very limited method for users to modify the preprogrammed routines, but does not provide a method for inputting different choices for achieving calendar tasks. The system also does not have a planning system that permits the computer to select the optimum sequence of tasks and appointments based on a predetermined criteria, such as user goal maximization. The system also does not have any ability to reschedule events or appointments in response to surprises, distractions or unanticipated problems, to automatically reschedule the events, or to detect and resolve conflicts in the new schedule.

Another system for helping a user with a cognitive disorder comprises a desktop computer system at a central location and a pager that is worn by the user. The system is intended to cue or remind the user with the cognitive disorder when it is time to start or stop an appointment or calendar event. To operate this system, the user or a caregiver calls a dispatcher and describes their schedule for the week. The schedule of the user is entered into the computer system located at the pager operator's site. The computer system then sends messages to the user, over the pager frequency, to remind the user of appointments and events. This system does not permit the user to enter sequences of events (i.e., scripts) and does not permit the user to easily modify a task because any modification requires that the user or caregiver call the dispatcher. In addition, the computer system does not provide any system for planning, as described above, because the dispatcher is unlikely to be able to determine how to reschedule the calendar based on the missed appointment.

Therefore, there is a need for an automatic planning and cueing system and method which avoid these and other problems of known systems and methods, and it is to this end that the present invention is directed.

SUMMARY OF THE INVENTION

A machine-implemented, automatic planning and cueing system and method for calendars is provided that permits the entering of calendar goals with priorities and reward values specific to a user in which the goals may be used by the calendaring system to plan a schedule of tasks with the highest reward value for a particular user. The system may also permit the entry of scripts, which may be a programmed sequence of tasks or appointments, and the scripts may be followed by a user. Any script step may be another script. The system may also permit the prioritizing of appointments and tasks. The system may also permit resource and method choices to be identified by the user and those choices may be used by the system to re-plan a series of tasks. The system may mimic human task planning and execution capabilities that normally occur within the frontal lobes of a brain of a user.

The planning and cueing system may also compare different scripts or different choices within the same script before the scripts are executed and determine the best script variation based on, for example, the maximization of the goals of the user. The system may also remind the user of the beginning or ending or calendar tasks by using audible or visual cues. The system may also process any plan corrections and correspondingly adjust the user cues. The system may also proceed through each script step and provide the user with a cue at the beginning and end of each step. If a step of a script is delayed, then the later steps of the script may be delayed. The system may also permit the user to override the goals or the cues at any time. The system may also detect surprise or unanticipated events based on a user's response and adjust the plan to take into account those unanticipated events. The system may also have an internal clock to keep track of the time and may automatically turn its power on, as necessary, to cue the user about an appointment.

The system may also have floating events or appointments that do not have a certain start time, but should be completed during a certain predetermined period of time. As changes in the plan occur due to various reasons, these floating appointments may be automatically moved around the user's schedule to adjust for the other changes in the user's schedule. The system may also be customized, based on a particular user's planning ability, such that the system may be used by a busy person with a healthy brain or a person with a severe cognitive disorder.

In accordance with the invention, a method for automatically planning a series of events into a plan is provided, comprising the steps of determining a plurality of events that a user is going to perform, each event comprising a predetermined duration, a predetermined period of time to complete the event, and a criteria for completing the event, organizing said events into a plan for a user based on the duration and criteria of each event, determining, during execution of the plan, that an unexpected event has occurred, and changing the plan of the user automatically in response to the unexpected event so that the unexpected event is added into the plan with minimal disruption to the plan. A system for automatically planning a script into a plan is also provided.

BRIEF DESCRIPTION OF THE DRAWINGS

FIG. 13 is a diagram of a screen displaying a particular task;

FIG. 14 is a diagram of a screen displaying more details of the task of FIG. 13;

FIG. 21 is a diagram illustrating a screen displaying a particular name record;

FIG. 22 is a diagram illustrating a screen displaying a find function to find data within the databases of the system;

FIG. 23 is a diagram illustrating a screen displaying a plan for a user with two appointments;

DETAILED DESCRIPTION OF PREFERRED EMBODIMENT

The invention is particularly applicable to an automatic planning and cueing system and method for helping a person with a cognitive disorder and in particular to a system that may automatically replan a user's schedule due to an unexpected event. It is in this context that the invention will be described. It will be appreciated, however, that the system and method in accordance with the invention has greater utility to anyone who with dynamic scheduling needs or for personal project management. To better understand the invention, a description of some of the broad concepts applicable to the invention will be provided.

To store various information about a user's schedule and appointments for the day as well as provide some planning function, a plurality of pieces of information may be stored. A "condition" may be a stored description of a state external or internal to the system. For example, the fact that the cupboard contains two soup cans or that the battery of the device is low are both conditions. These conditions may affect a user's schedule or appointments in various ways. A "goal" is a mapping from a condition to a positive or negative reward value or priority. For example, the goal of completing a homework assignment may be worth one hundred points or may have a high priority. As another example, a negative goal of bouncing a check that may be worth negative one hundred points. These goals and rewards, which may be collectively known as "criteria", may provide a user a scoring function with some indication of the number of high priority appointment or events that the user has completed since a large positive value indicates a large number of completed priority tasks.

Figure 24:
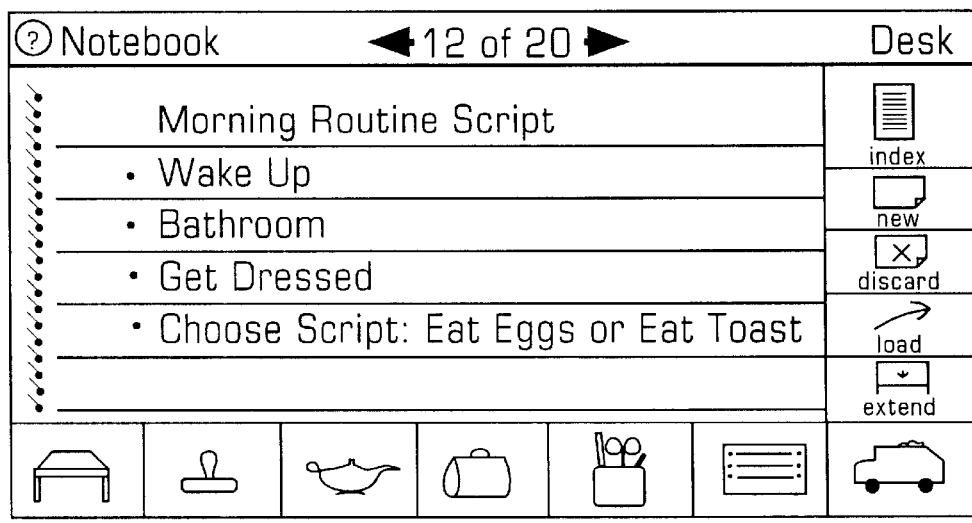
FIG. 24 is a diagram illustrating a morning script with breakfast choices of a user contained within the plan shown in FIG. 23.
Figure 25:
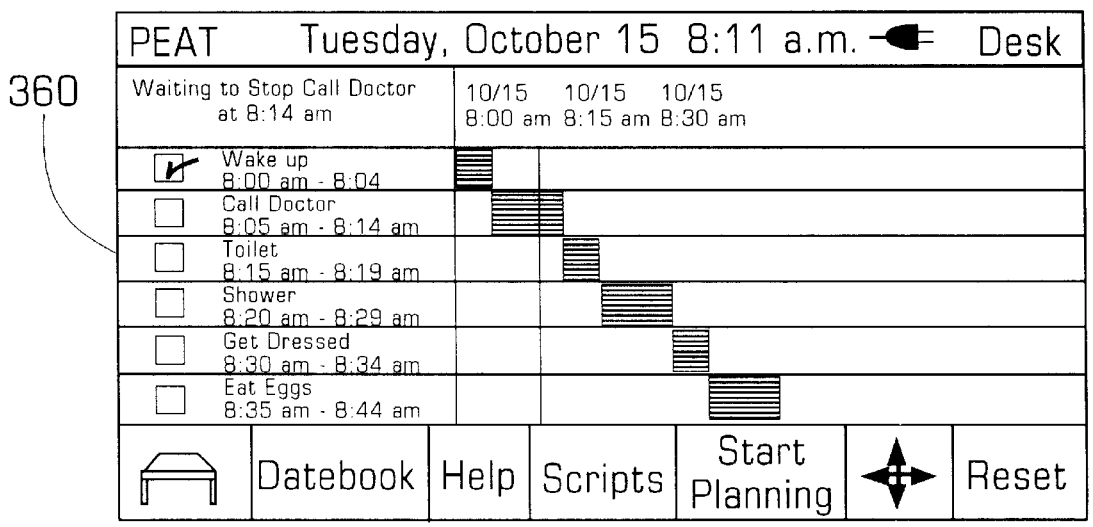
FIG. 25 is a diagram illustrating a schedule for the user of the plan shown in FIG. 23.

A user of the system may enter a script which may be one or more specific tasks or appointments that make up a sequence of steps to be performed by a user. The script also specifies the particular order of the tasks within in the script. Each task within the script may be the name of a script so that scripts may be nested within other scripts. A task may be an act that the user needs to perform any time during the day, while an appointment may be a task that has a particular starting time. For example, a morning routine script (as shown in FIGS. 24 and 25) may include the tasks of getting out of bed, showering, making breakfast and eating the breakfast. A daily script may be a set of goals with stop times within the next twenty-four hour period, which thus define an entire day's worth of appointments, tasks and goals. A script may be developed for a variety of different purposes, such as school tasks or work tasks since a script is a sequence of tasks which may be used to break more complex tasks into a sequence of simpler tasks.

The system may plan the user's schedule using tasks and each task is defined by a earliest start time, a latest stop time and a duration equal to the time required for a user to complete the task. For any task, the time period between the earliest start time and the latest stop time may be greater than or equal to the duration of the actual task. The tasks may be fixed tasks or floating tasks. A fixed task has a task duration that is equal to the time period between the earliest start time and the latest stop time so that there is no time during which either the start time or stop time may slip (e.g., slack time). A floating task has a task duration that is shorter than the time period between the earlier start time and the latest stop time (e.g., some slack time) so that the actual start time or stop time may be adjusted to compensate for changes in a user's plan.

The system in accordance with the invention may also simulate the execution of several different script variations in order to plan a user's schedule and determine an appropriate script choice for a user based on predetermined criteria. The predetermined criteria may be a reward for successfully completing a task or a priority for each task. The results of the simulated execution of the script may be stored as a simulation record and used for future reference. When a script is actually executed by the system, the results of the script's execution may be stored as an execution record that may be used for later planning. Now, a description of the system and method in accordance with the invention will be provided.

Figure 1:
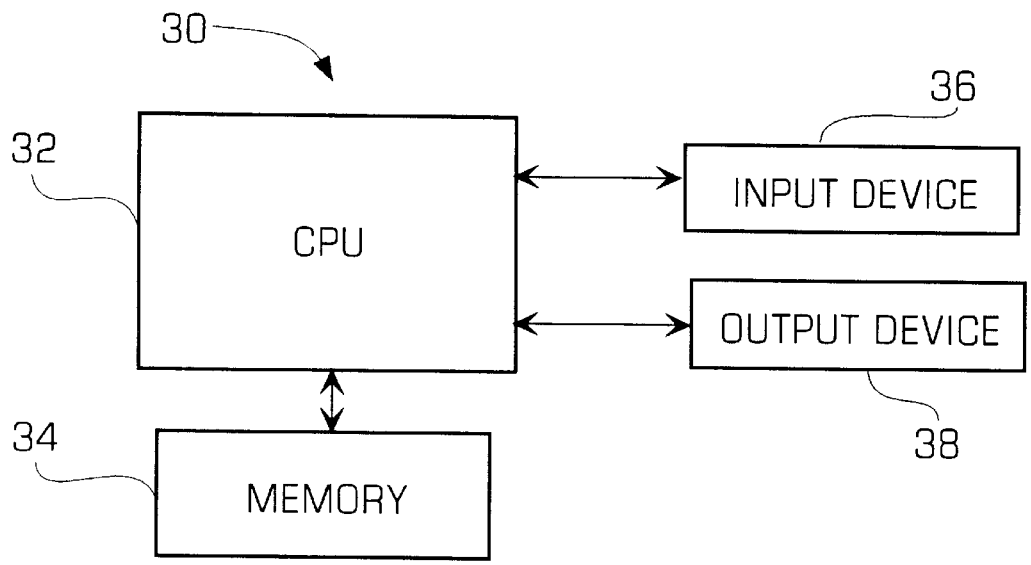
FIG. 1 is a block diagram of a computer system that may execute the planning and cueing system in accordance with the invention.

FIG. 1 is a block diagram of a computer system 30 that may include a planning and cueing system in accordance with the invention. The computer system may include a central processing unit (CPU) 32, a memory 34, one or more input devices 36 and one or more output device 38. The CPU may execute application programs stored in the memory. The memory may be any type of memory, such as random access memory (RAM), a read only memory (for permanent application code or the operating system), hard disk storage, magneto-optical storage, CD storage, a flash memory, or an electrically erasable programmable read only memory (EEPROM). The system for calendaring, planning and cueing in accordance with the invention may be a software application program being executed by the CPU and the application program and data may be stored in the memory. The system for planning and cueing in accordance with the invention may also be preprogrammed into a read only memory (ROM) or EEPROM. The system for planning and cueing may have an internal clock and, as necessary, may wake itself up to cue the user about an appointment.

The CPU receives input from a user through the input device 36 which may be, for example, a keyboard, a touch-sensitive screen, a microphone for voice commands, and other external sensors that may interact with external devices, such as an external clock, telephones, facsimile machines, Internet connections, global positioning systems, cameras or modems. The keyboard, touch-screen or the microphone may permit a user to enter commands into the system and control the planning and cueing system, or to respond to cues from the planning and cueing system. The CPU may output data, such as a graphical screen commands that the user may interact with or an audible cue that the user must acknowledge, to the output device 38 that may be a display, such as a liquid crystal display (LCD), a speaker or any other type of device that permits the CPU to communicate information to the user. For example, the CPU may output an audible or visual cue to the user to stop, start or continue a task, a message to the user in the form of a voicemail, facsimile message, e-mail message or beeper message, a command to an X-10 appliance such as a coffee pot, that may be controlled automatically by the system, a command to a PCMCIA card device, a synthesized or recorded voice message to the user, or a video image to a television or a VCR. Now, a detailed description of a handheld computer system that may execute the planning and cueing system in accordance with the invention will be described.

Figure 2:
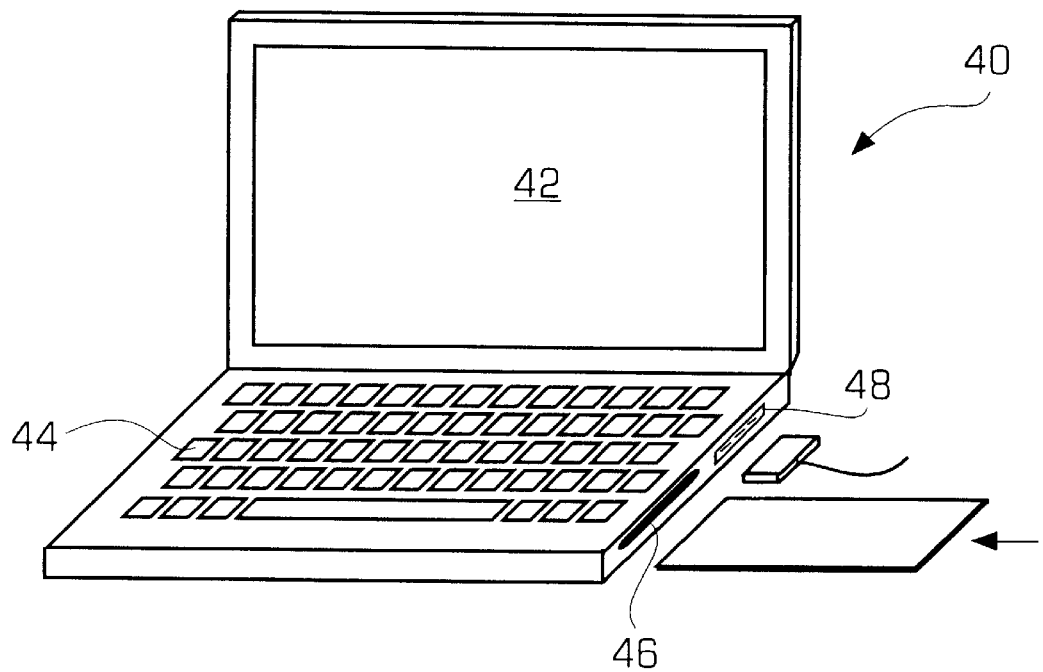
FIG. 2 is a perspective view illustrating a handheld computer that may be used to execute the planning and cueing system in accordance with the invention.

FIG. 2 is a perspective view of a handheld computer system 40 that may execute the planning and cueing system in accordance with the invention. The handheld computer system may be any computer system with sufficient processing power to execute the planning and cueing method, such as a Casio Casiopia handheld computer executing a window-based operating system. The invention, however, is not limited to any particular computer system and may also be executed on a desktop system or any other type of computer system. The handheld computer system may include a display screen 42, a keyboard 44, a PCMCIA card slot 46, and a serial port 48. The handheld computer system may also have a memory card, such as a flash memory. The PCMCIA card slot and the serial port may be used to communicate data between the CPU and the outside world. The PCMCIA card slot may also be used for memory. Now, a first embodiment of the planning and cueing system in accordance with the invention will be described.

Figure 3:
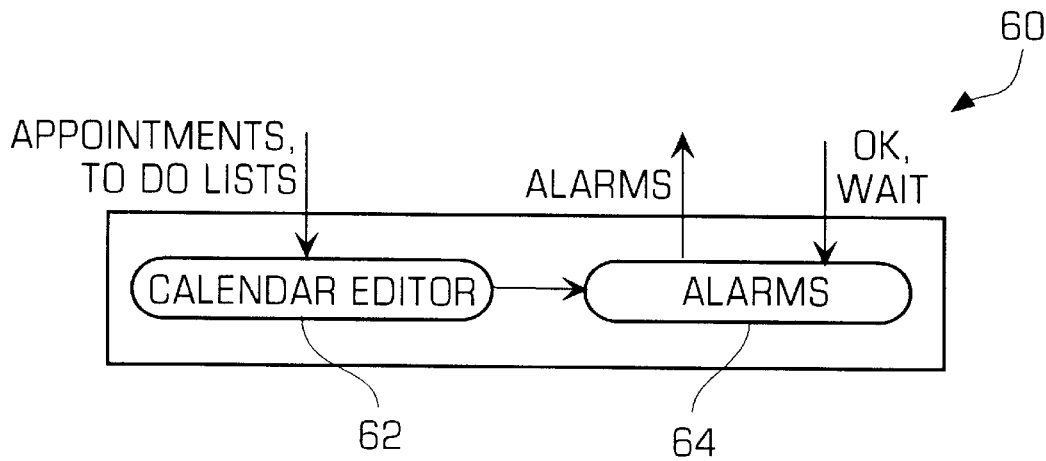
FIG. 3 is a functional diagram of a first embodiment of a planning and cueing system in accordance with the invention that may be executed by the computer system of FIG. 2.

FIG. 3 is a block diagram of a first embodiment of a planning and cueing system 60 in accordance with the invention. As shown, the system 60 may include a calendar editor 62 and an alarm system 64. Appointments, to do lists, floating appointments that are described below, and other information may be entered into the calendar editor 62 by the user. For a person with a severe cognitive disorder who cannot plan his day, a caregiver for the user may enter the information into the calendar editor. The calendar editor may schedule the appointments, tasks and floating tasks into the user's calendar and determine whether there are any conflicts in the schedule.

As will be described in more detail later, once all of the information has been entered into the calendar editor, the user may carry the handheld computer system shown in FIG. 2, which contains the planning and cueing system in accordance with the invention, with him throughout the day. The calendar editor 62 communicates with the alarm system 64 and may determine when the alarm system should generate an alarm signal, such as an audible and/or visual alarm, to remind the user of the beginning or end of an appointment. As described above, the system may automatically turn itself on when it is necessary to cue the user. People with severe cognitive disorders may be easily distracted and forget how much time is passing and require alarms or cues to remind them to start and/or stop a task or an appointment. For example, a person with a severe cognitive disorder typically requires a cue to begin an appointment or task as well as a cue reminding him that the time period allotted for the task has expired. For a person with a less severe cognitive disorder, or a businessperson who wants reminders, the planning and cueing system may be customized for a particular user with a particular level of planning ability.

The planning and cueing system may also require the user to respond to a visual and/or audible cue and may adjust the calendar schedule in response to the user's response. The response to each cue may also be customized. For example, for a person with a severe cognitive disorder, the system may continually repeat some cue, such as an audible sound every three seconds until the user responds, whereas for a typical businessperson, the system may generate an audible signal only once, or every minute because a businessperson may not require the same level of reminding. Now, a second embodiment of the planning and cueing system in accordance with the invention will be described.

Figure 4:
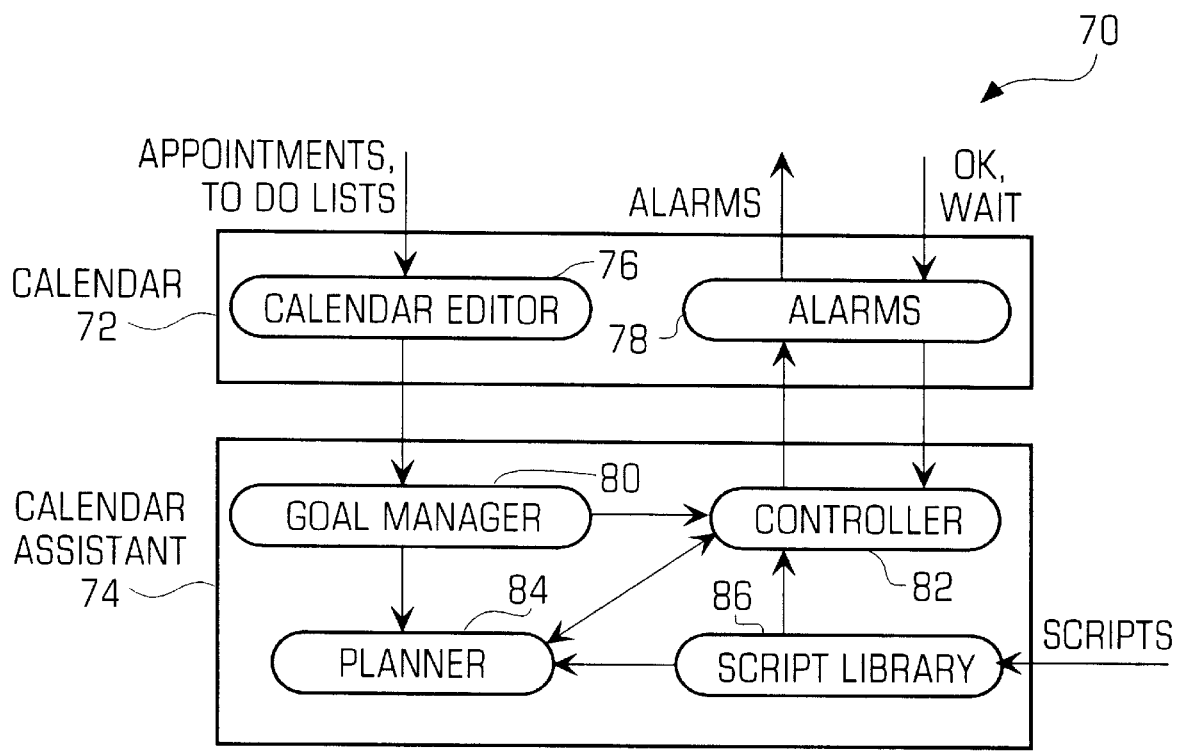
FIG. 4 is a diagram of a second embodiment of a planning and cueing system in accordance with the invention that may be executed by the computer system of FIG. 2.
Figure 5:
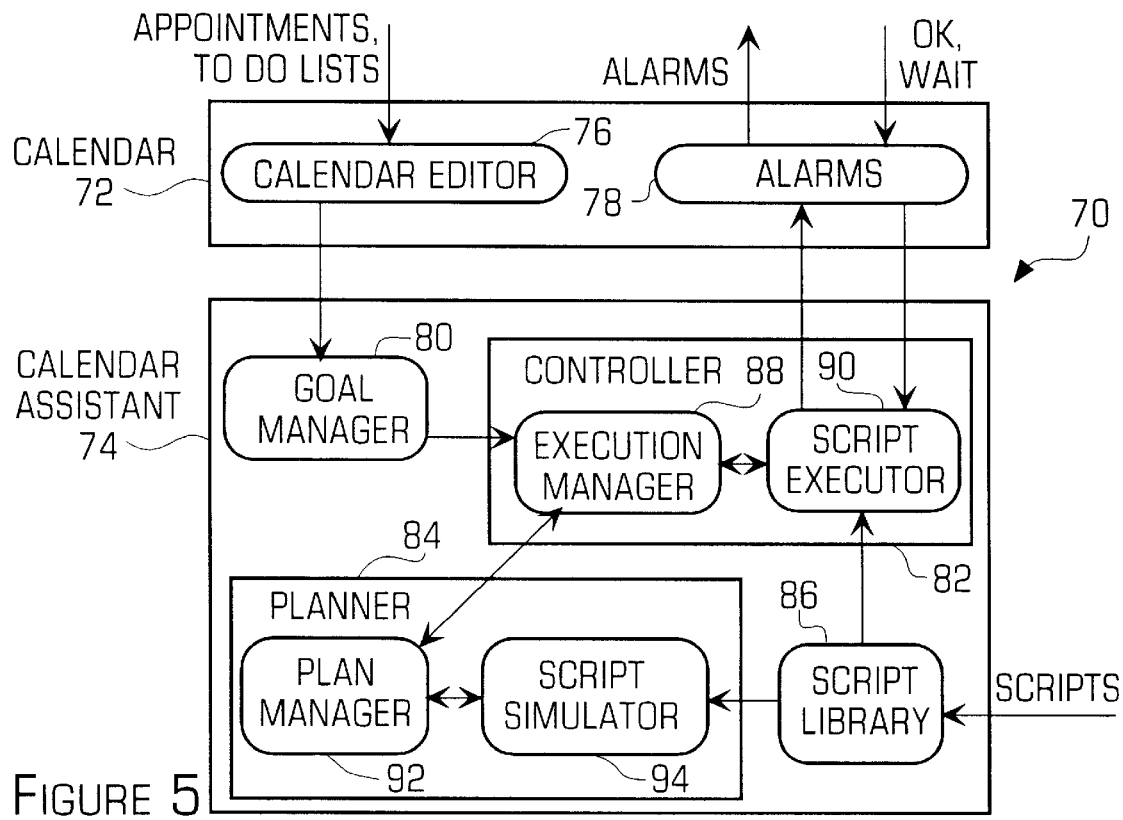
FIG. 5 is a more detailed diagram of the second embodiment of the planning and cueing system shown in FIG. 4.

FIGS. 4 and 5 show a broad overview of a second embodiment of the planning and cueing system 70 that may include a calendaring system 72 associated with a calendar assistant 74. As described above, the calendar system 72 may include a calendar editor 76 and an alarm system 78 that operate in a similar manner as described above. The calendar assistant 74 may include a goal manager 80, a real-time controller 82, a planner 84 and a script library 86. The goal manager may receive goal information of the user and process the information into a goal list. The goal manager may also update the goal list when needed, and provide the goal list to the planner 84 which uses the goal list to plan a schedule of tasks and appointments for the user. The planner may adjust the planned schedule based on the goal list, as described below. The script library 86 may receive scripts from an external source, such as a plurality of predefined task sequences stored in a script library, and may generate a plurality of scripts that may be used by the planner 84 to generate a schedule for the user.

The output of the planner, which may be a schedule, and the output of the script library, that may be a script, may be fed into the controller 82 which may control the alarm system 78 and determine when alarms should be generated by the alarm system based on the schedule and the scripts. In addition, when a user responds to an alarm or indicates that an unexpected event has occurred, the controller may receive that information and pass the information onto the planner 84 so that the planner may determine any changes in the user's schedule as a result of the responses of the user. For example, if an appointment has to be extended past its original stop time, the planner may reschedule the rest of the user's tasks and appointments during the rest of the day. An example of the scheduling of the floating appointments (i.e., to-do items) and the revision of the appointments due to surprises or unanticipated events will be described below. Now, more details about several portions of the second embodiment of the planning and cueing system will be described.

FIG. 5 is a block diagram of the planning and cueing system, and in particular, illustrates more details about the controller 82 and the planner 84. The controller may include an execution manager 88 and a script executor 90 and the planner may include a plan manager 92 and a script simulator 94. The execution manager 88 within the controller may accept information from the goal manager 80, such as a goal list, and from the plan manager 92, such as a planned schedule for the user, and execute the user's schedule. The execution manager may also communicate with the script executor 90 so that the planned schedule may contain a script which may be executed by the script executor 90. The script executor may communicate with the alarm system 78 to indicate when to generate an alarm signal and may receive responses from the user. Any responses of the user that affect the user's schedule may be passed on to the planner 84. The script executor 90 may execute customized scripts for a particular user, but may also execute predefined scripts from the script library 86.

The plan manager 92 within the planner may accept information from the goal manager, the execution manager, and the script simulator and use that information to generate a planned schedule for the user. The script simulator 94 may permit the planner 84 to simulate execution of a script to determine, prior to actual execution of the script, whether there are any conflicts caused by the script. The script simulator may also permit the planner to simulate two similar scripts variations with slightly different tasks or appointments and determine which version of the scripts is best suited for the user based on the goal list received from the goal manager. The script simulator may also receive predefined scripts from the script library 86. There may be choices within the scripts which identify alternate resources and methods. The script simulator may use the choice in the script to simulate different script variations, compare the results and select the most effective variation.

In operation, the user or caregiver may enter various information into the system, including goal information, appointments, tasks, to-do items and floating tasks, as described below. Each task and appointment may have a priority and a goal associated with it which permits the planner to automatically determine a schedule for a user based on the priorities and goals. For example, in the event a task is delayed due to an unexpected event, such as a phone call, a task with the lowest priority or lowest reward may be canceled to accommodate the delay of the user's plan. The planning and cueing system may generate a plan for the user based on updated information from the user. The plan may include scripts, appointments, fixed start time tasks and floating tasks that the planner may place within the plan only after the planner has determined that the plan is appropriate for the user based on the user's goals. Once the planner has generated the plan, it may be executed and alarms/cues may be generated at appropriate times to remind the user of appointments, tasks, and the like. The system may automatically turns itself on in order to provide the user with a cue. The user may respond to the alarms/cues or alert the system to an unexpected event, such as pausing during a meal to receive a telephone call. The system may change the user's plan based on the user's responses or based on the unexpected event. For example, if an unanticipated event occurs which makes it impossible to make an appointment, the planner may revise the plan of the user to account for the unanticipated event. The change made by the system will depend on the user's goals and priorities for the various remaining tasks and appointments. An example of this planning will be provided below. Now, floating tasks, in accordance with the invention, will be described.

A floating task may require a predetermined amount of time for the event to occur, and may occur during a predetermined period of time, but may not have any specified start time or end time. These floating tasks may include to-do items which may be done at some time during the day so that the system in accordance with the invention may incorporate to-do items into a user's plan and reschedule those to-do items as appropriate. For example, a task of going to the bank to withdraw money may occur sometime during the day, and may take about fifteen minutes. But there is no specified start or end time. The task may be limited by the fact that the bank opens at 9:00 A.M. and closes at 4:00 P.M. Thus, the floating task must be completed between 9:00 A.M. and 4:00 P.M., but there is not any specified start or end time for the task. These floating tasks may be scheduled by the planner according to the time available in a day. For example, a floating task may be initially scheduled for 10 AM. Then an unexpected event occurs and the user is going to be busy from 10 AM to 11 AM so the planner may reschedule the floating task to 3 PM. Thus, the system in accordance with the invention may use the floating events to help juggle the schedule of the user around unexpected events or surprises. Both the fixed and floating appointments may have priorities or rewards associated with them so that a higher priority floating task may preempt a lower priority fixed task. Now, the structure of the databases within the planning and cueing system in accordance with the invention will be described.

Figure 6:
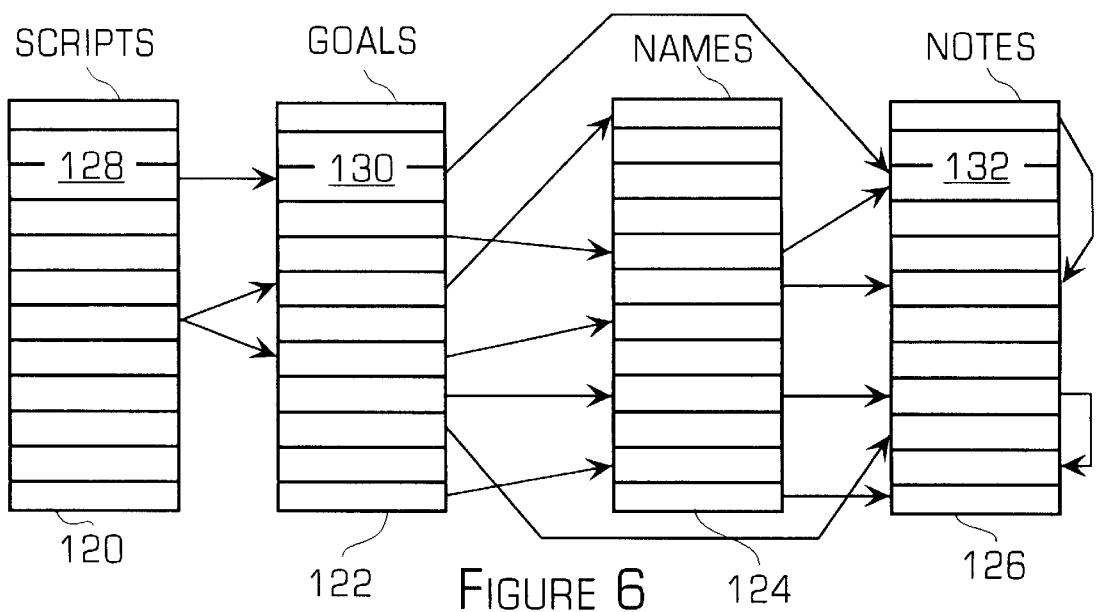
FIG. 6 is a diagrammatic view of the linked databases contained within the planning and cueing system in accordance with the invention.

FIG. 6 is a diagram illustrating a plurality of data structures that may be used to store data for a user in connection with the planning and cueing system in accordance with the invention. For example, the system may store a list containing a plurality of scripts 120, a list containing a plurality of goals 122, a list containing a plurality of names 124 and a list containing a plurality of notes 126 that are linked together. Thus, a particular piece of data in a list may be associated with another piece of data in another list so that related data may be retrieved quickly. For example, as shown, a particular script 128 may be linked to a particular goal 130 which in turn may be linked to a particular note 132. For example, a script to make dinner may be linked to a goal of food shopping that may be linked to a note containing a list of food to buy at the store. Similarly, a script may be linked to a goal which is in turn linked to a person's name. Now, the operation of the planning and cueing system in accordance with the invention will be described.

Figure 7:
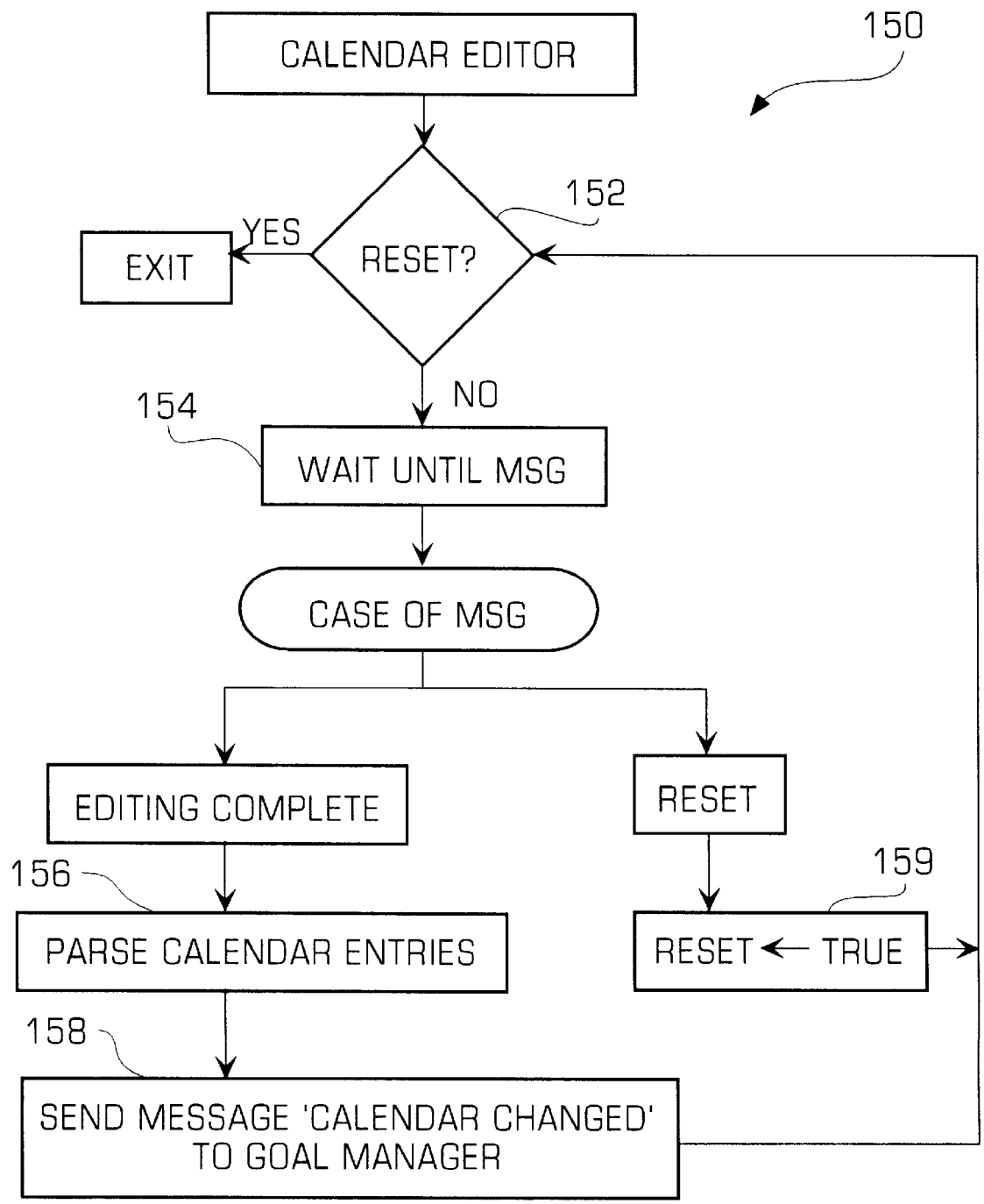
FIG. 7 is a flowchart of a calendar editor in accordance with the invention.

FIG. 7 is a flowchart illustrating a method 150 for editing a calendar that may be carried out by the calendar editor 76 shown in FIGS. 4 and 5. The calendar editor may edit events within the calendar in accordance with a user's responses and unexpected events. The calendar editing method may continue to execute unless a reset condition occurs as shown in step 152. If a reset has not occurred, then the calendar editor may wait for either an "editing completed" message or a "reset" message in step 154. If an editing completed message is received, the calendar editor may parse the user's change in the calendar in step 156 to generate a changed calendar and generate a "calendar changed" message in step 158 that may be communicated to the goal manager so that the goal manager may edit or update the goals based on the changes in the calendar. If a reset message is received, then the system may set the reset flag to true in step 159 and exit the method in step 152 because the reset flag is set. Now, the operation of the goal manager 80 shown in FIGS. 4 and 5 will be described.

Figure 8:
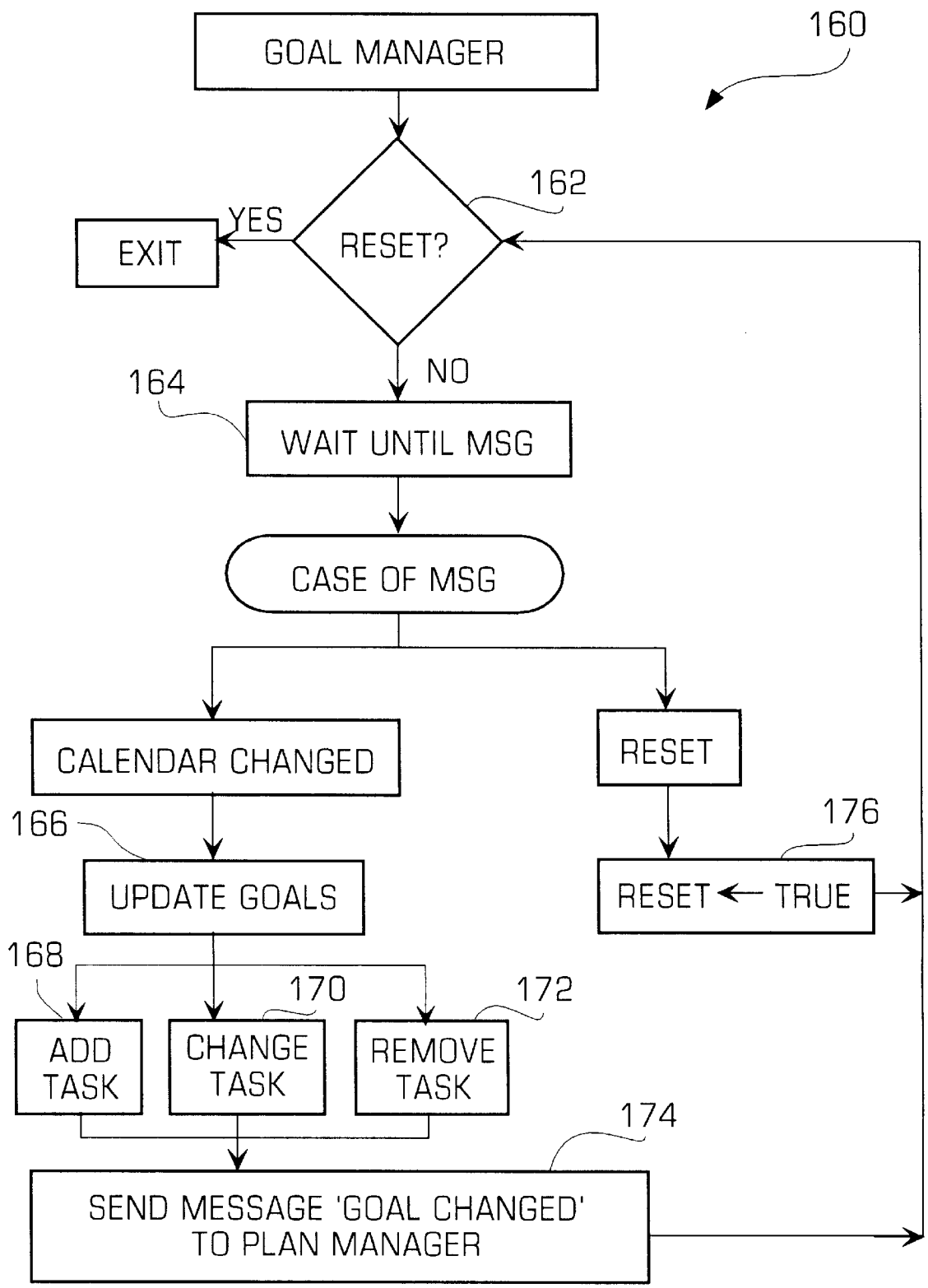
FIG. 8 is a flowchart of a goal manager in accordance with the invention.

FIG. 8 is a flowchart of a method for managing goals 160 that may be carried out by the goal manager 80 as shown in FIGS. 4 and 5. The method may repeat, as above, until a reset condition has occurred as shown in step 162. If no reset event has occurred, in step 164, the goal manager waits until either a "changed calendar" message or a reset message has been received from the calendar editor, as described above. Once a "changed calendar" message has been received, the goal manager may update the goals of a user in step 166. The updating of the goals may occur is several ways, including adding a task in step 168, changing a task in step 170, and removing a task in step 172, based on the type of change to the calendar that has occurred. The goal manager may send a message, in step 174, to the plan manager indicating that a goal of the user has been changed. If a reset message is received, the reset flag becomes true in step 176 and the exit will end at step 162 because the reset flag is not set. Now, the operation of the plan manager 92 as shown in FIGS. 4 and 5 will be described.

Figure 9:
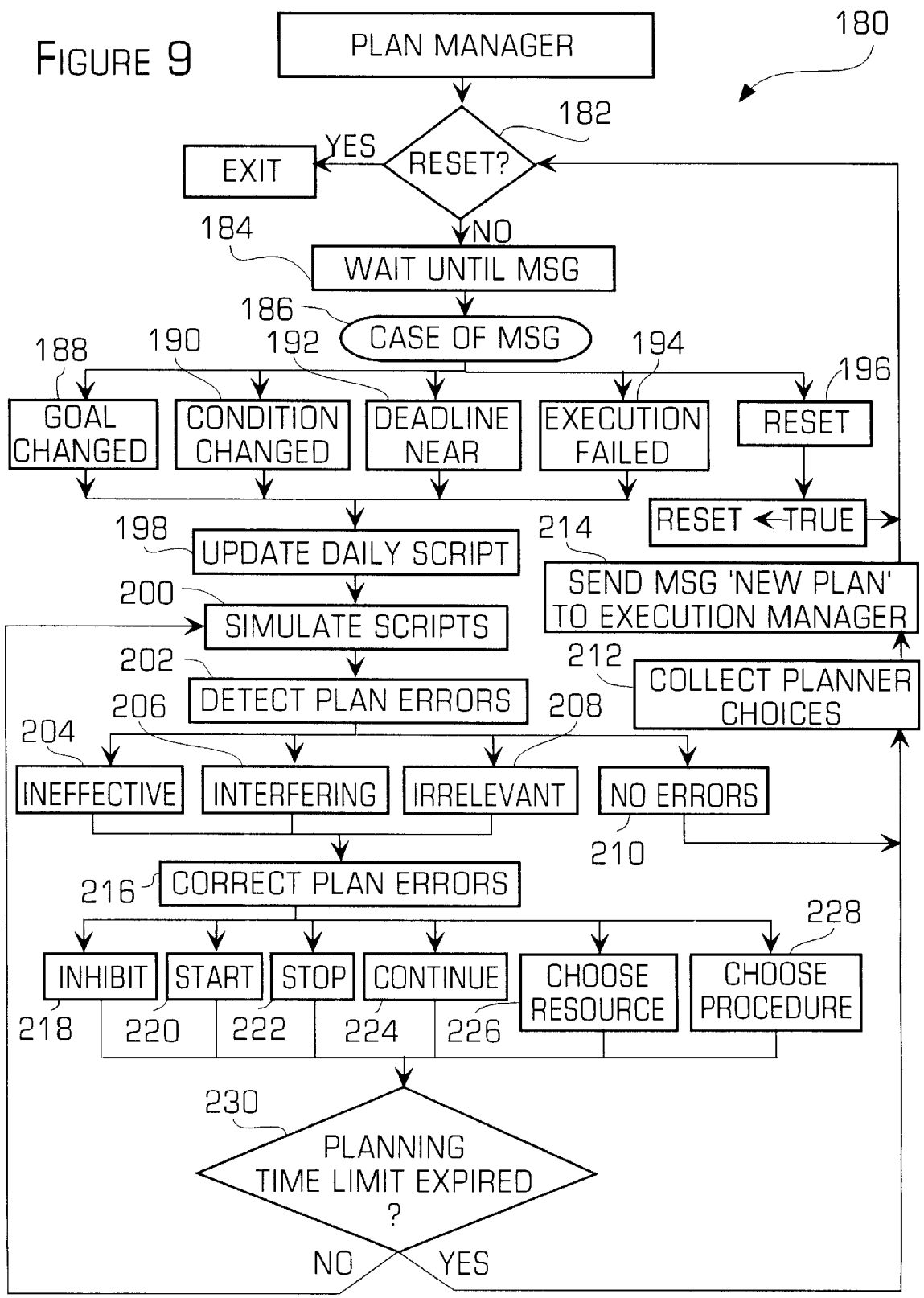
FIG. 9 is a flowchart of a plan manager in accordance with the invention.

FIG. 9 is a flowchart of a method for managing a plan of a user 180 that may be carried out by the plan manager 92 as shown in FIGS. 4 and 5. The plan manager may continue to execute unless a reset condition is encountered as shown in step 182. If no reset condition has been encountered, the plan manager may wait for a message from the other systems within the planning and cueing system in step 184. The message received by the plan manager may include a goal changed message 188 from the goal manager, a condition changed message 190 from an external sensor or generated due to a user's response to a cue, a deadline near message 192 from a clock within the system, and an execution failure message 194 from the execution manager, or a "reset" message 196 from the user. If a reset message is received, the plan manager may stop executing. For the non-reset messages, the daily script of the user may be updated in step 198 based on the message as described below in more detail.

Once the daily script is updated, the plan manager may simulate the changed or modified script in step 200 to determine if the edited or modified script causes any conflicts or other errors as shown in step 202. The possible errors detected by the plan manager may include ineffective plan errors 204, interfering plan errors 206 and irrelevant plan errors 208. If there are no errors in the modified or revised script, as shown in step 210, the plan manager may collect any planner choices (i.e., changes to the script chosen by the plan manager) in step 212, send a "new plan" message to the execution manager in step 214 and return to waiting for a message in step 184.

The ineffective plan errors may be a plan that cannot be performed due to an outside condition (i.e., the task is to make a sandwich, but there is no bread in the kitchen). An irrelevant plan error may be a task that is possible to perform, but does not achieve any goal or reward value. An interfering plan error occurs when two or more scripts compete for a shared (limited) resource, such as time. A method for correcting that error in step 216 is described below. An example of an interfering error may be that the user is proposing to go to a bookstore to buy a book with his lunch money prior to going to lunch. To correct this error for a person with a severe cognitive disorder, the system may choose from several possibilities based on priority levels and other factors. For a user with more ability to plan his day, the system may simply notify the user of the conflict and permit the user to pick the choice for solving the conflict. The system may also automatically add tasks to a user's schedule to achieve preconditions for a task that the user may added to his schedule. For example, a meeting task at a remote location may be added by the user and the system may automatically add a task of driving to the meeting to the schedule because the user cannot meet with someone unless he is at the proper location. As another example, a meal preparation task may require the system to add a trip to the grocery store.

When the system corrects the plan errors in step 216, the system may override default script choices with planner selections. For example, the planner may inhibit/cancel a default start condition for a task that is, by default, going to be started in step 218, may start a task that was not going to be started in step 220, stop a task that was supposed to continue in step 222, continue a task that was supposed to stop in step 224, override a default resource choice in step 226 or override a default procedure choice in step 228. The plan manager may then determine, in step 230, whether the allotted time for the plan manager to plan a user's script has expired. For example, the plan manager may have twenty seconds to plan the user'script and detect any errors. The time required by the plan manager may be small for small changes in the user's script. If the planning time has not expired, then the plan manager may return to step 200 and continue simulating scripts to detect a better sequence of events, and any errors. If the planning time has expired, then the plan manager may collect the planner choices in step 212, as described above, send a "new plan" message to the execution manager in step 214 and return to the waiting for a message step 184. Now, the operation of the execution manager 88 as shown in FIGS. 4 and 5 will be described.

Figure 10:
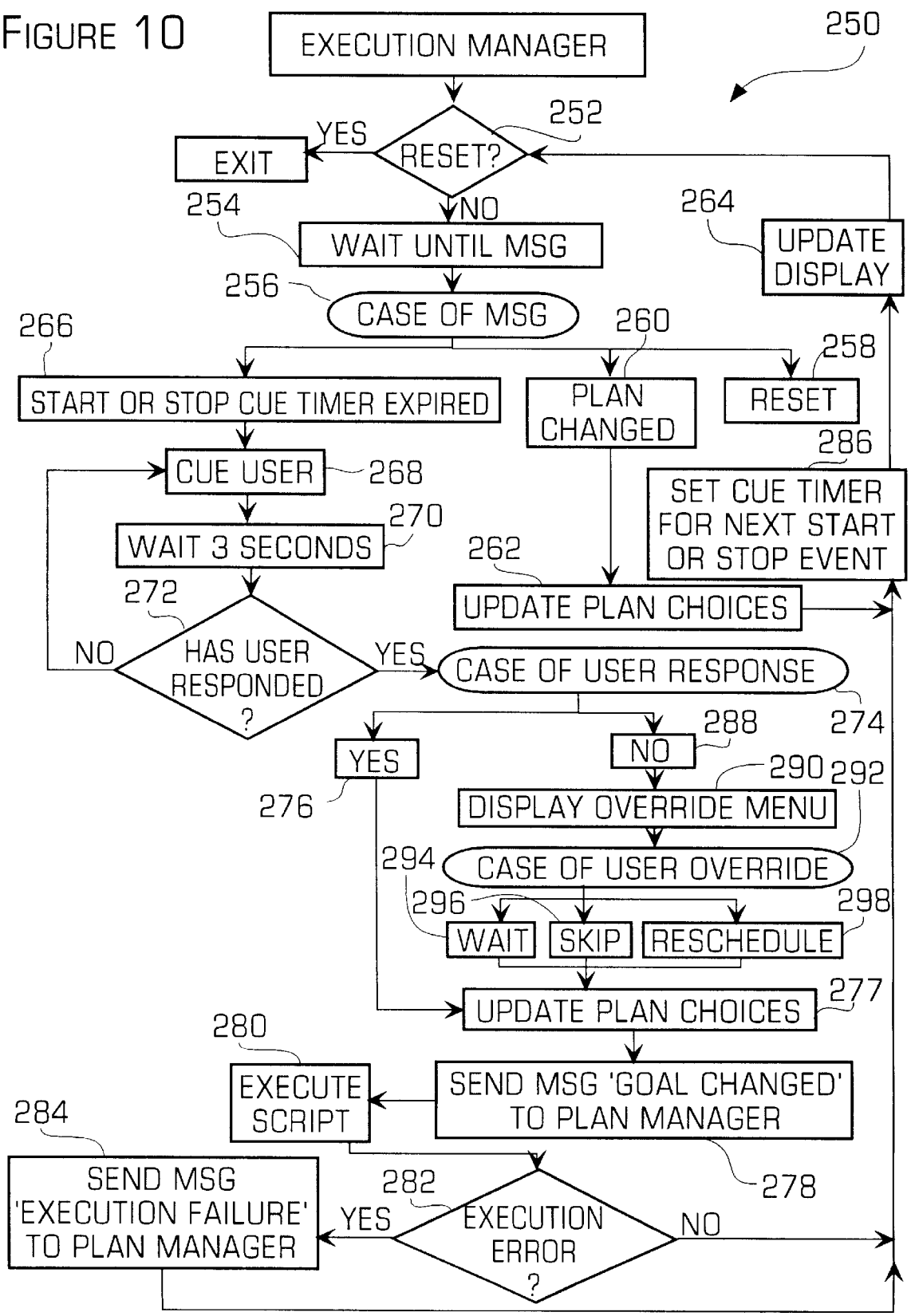
FIG. 10 is a flowchart of a execution manager in accordance with the invention.

FIG. 10 is a flowchart illustrating a method 250 of executing a user's script in accordance with the invention that may be executed by the execution manager 88 shown in FIGS. 4 and 5. The method may continue to execute until a reset has occurred as shown in step 252. If no reset has occurred, then the execution manager may wait for a message in step 254. The message may be, for example, to reset the system 258, to receive a new plan 260, or start/stop a task 266. If there is a reset message, then the system may be reset. If there is a new plan message, then any plan rules may be updated in step 262 to account for the new plan generated by the planner, the display of the system may be updated in step 264 within the new plan, and the system may wait for another message in step 254. The plan rules are generated by the planner and the rules direct the executor what choices to make when choices are available.

The system and the operating system have a clock to perform an action at a specific clock time and the system uses this clock to set up cue events. If the cue event message 266 is received by the execution manager, then the system may cue the user in step 268 and wait three seconds for a response in step 270. It is then determined in step 272 whether the user has responded to the cue. If the user has not responded, then the execution manager may loop back to steps 268 and 270 and re-cue the userand wait for a response. If the user has responded, then the system may determine the user's response in step 274. If the user responds to the cue with "Yes" in step 276, then the system may update the plan choices in step 277 based on the overrides, send a "calendar changed" message to the plan manager in step 278, execute the script in step 280 and detect any execution errors in step 282. The calendar changed message informs the planner about the actual time the user started/stopped a task because if the user did not respond to a cue for five minutes, the plan must be adjusted to account for the five minute delay. If an execution error is detected, the system may send an "execution failure" message to the plan manager in step 284, set a next timer event based on the user's script in step 286, update the display in step 264 with the new timer event and return to waiting for a message in step 254. If there is no execution error in response to a user's positive response, then the execution manager may set the next cue timer event, update the display and return to the waiting for a message step.

If the user responds to the cue with a negative response in step 288, then the system may display an override menu in step 290 and the user may select a menu item from the override menu in step 292. The user may elect to wait (i.e., delay the beginning or end of an event) in step 294, skip a task in step 296, or reschedule a task in step 298. For a user with a severe cognitive disorder, the system may automatically select one of these options based on a user's goals and priorities. After each of these responses, the system may update the plan choices in step 277, send a "changed calendar" message to the plan manager in step 278 so that the plan manager may determine if the requested overrides cause any conflicts with the user's script, execute the script in step 280, determine if there are any execution errors in step 282, and so on as described above.

Each of the above systems within the planning and cueing system interact with each other to plan a user's schedule, simulate the schedule to detect and correct any conflicts, adjust the user's schedule in response to unexpected events or surprises and cue the user when a particular task is starting or ending. Thus, the system not only records and displays a user's schedule, as a conventional calendar may, but also automatically places tasks into the schedule, determines the proper sequence of the tasks, monitors the user's performance of the schedule using cues and plans a user's day and resolves conflicts between tasks in the schedule before the task occurs by simulating the scripts.

The planning and cueing system in accordance with the invention may have a set-up operation that permits the customization of the system for a particular user. The system may be configured to provide different levels of assistance for different users. For a person with a severe cognitive disorder, a caregiver may set-up the system and enter most of the information into the system, such as goals, appointments and tasks. In addition, for a person with a severe cognitive disorder, the system may automatically resolve a conflict in the user's schedule. On the other hand, for a business user who simply needs a system to remind him of dates and spot conflicts, the system may be set-up such that the system may detect conflicts within the schedule, but provide the user with the options available to resolve the conflict and permit the user to select how to correct the conflict. Thus, the system may be set-up and optimized for a plurality of users with a plurality of different needs.

During the set-up, the user or caregiver may also define the goals and rewards that apply to a particular user and define the various scripts to accomplish those goals. The set-up may also permit a selection of the choices available to the user, as described above, and any user preferences. Now, a plurality of illustrative screen shots and examples of the planning and cueing system in accordance with the invention will be described.

The planning and cueing system may use scripts which are a sequence of tasks or appointments that a user may follow. An example of a script, such as that shown in FIGS. 24 and 25 may be a morning script that includes the steps of waking up for fifteen minutes, showering for twenty minutes, getting dressed for twenty minutes and a choice of breakfast meals (e.g., toast or eggs). Each step or task in a script, such as making eggs, may in turn be the name of another script (e.g., turning on the stove, placing a frying pan of the stove and cooking the eggs) so that the scripts may be nested together. Another script may provide a user with the steps for paying a credit card bill and may include the steps of preparing a check to the credit card company and writing the account number on the check. An example of a script template may be a template used for a meeting at a particular place (where) with a particular person (who). The steps of the script template may include reviewing notes and collecting supplies before the meeting, and going to the location of the meeting. Another example of a script may be a more complex script for shopping which may include a number of steps contained within a loop that may look like:

While the shopping list is not-empty
        item=next item on shopping list
        find item on shelf
        put item in cart
    End while
    Take Cart to Cashier
    Pay for Items
    Take Items Home
    Unpack items
    Place Items in Cabinets
    add items to kitchen inventory A script may also contain another script such that a script for a particular day may include a morning script which guides a user through the tasks, for example, of waking up, showering, dressing and eating breakfast. A script may also include a choice statement which may permit the choice of alternative resources, tasks, start times or stop times. A priority or reward may be associated with each alternative so that the system may automatically determine the best choice based on, for example, a user's goals. The system may also choose an alternative which maximizes the user's reward points.

Figure 11:
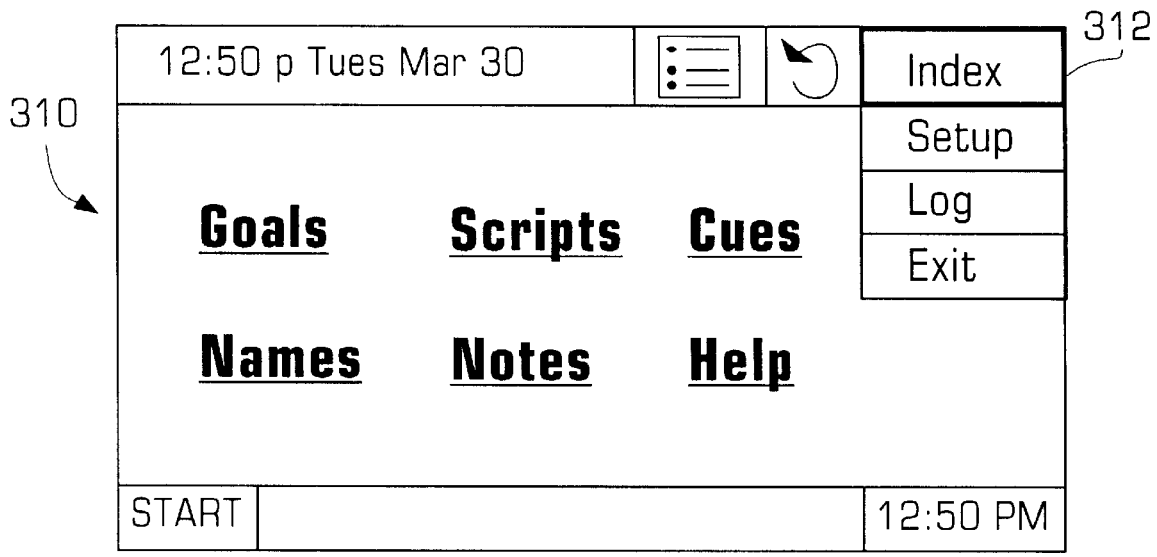
FIG. 11 is a diagram of a screen displaying a table of contents of information in accordance with the invention.

Examples of computer screen displays for the planning and cueing system that may be displayed while a user is using the system to perform a script in accordance with the invention will be described. These screens may utilize a large size font which is more easily viewed by a user, and may have colored items. For example, a high priority task may be red. FIG. 11 illustrates an initial table of contents screen display 310 for the system showing the various information that may be accessed by a user, such as a goals section, a scripts section, a cues section, a names section, a notes section, and a help section. The goals section permits a user to view his goals and edit them, if that option is available to the user. The scripts section permits a user to view and edit scripts. The cues section permits a user to view the cues for the current day and change those cues. The names section may operate like a typical address book and permit the user to view a particular person's address or phone number and modify the address book. The notes section permits the user to view or edit any notes associated with any tasks in the system. The help section may provide some on-line help to the user. The index screen may not have some of these options available to a user if the user has a severe cognitive disorder. The index screen and each screen of the system may also have a pull-down menu 312 that may provide the user with some additional options, if those options are available to the user.

Figure 12:
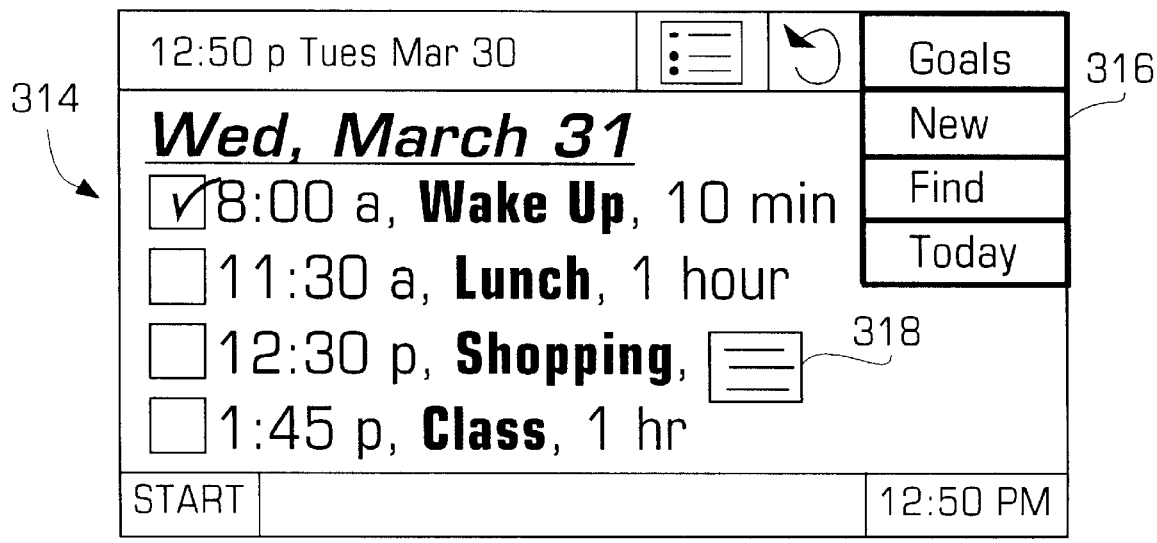
FIG. 12 is a diagram of a screen displaying a goals list in accordance with the invention.
Figures 13, 14:
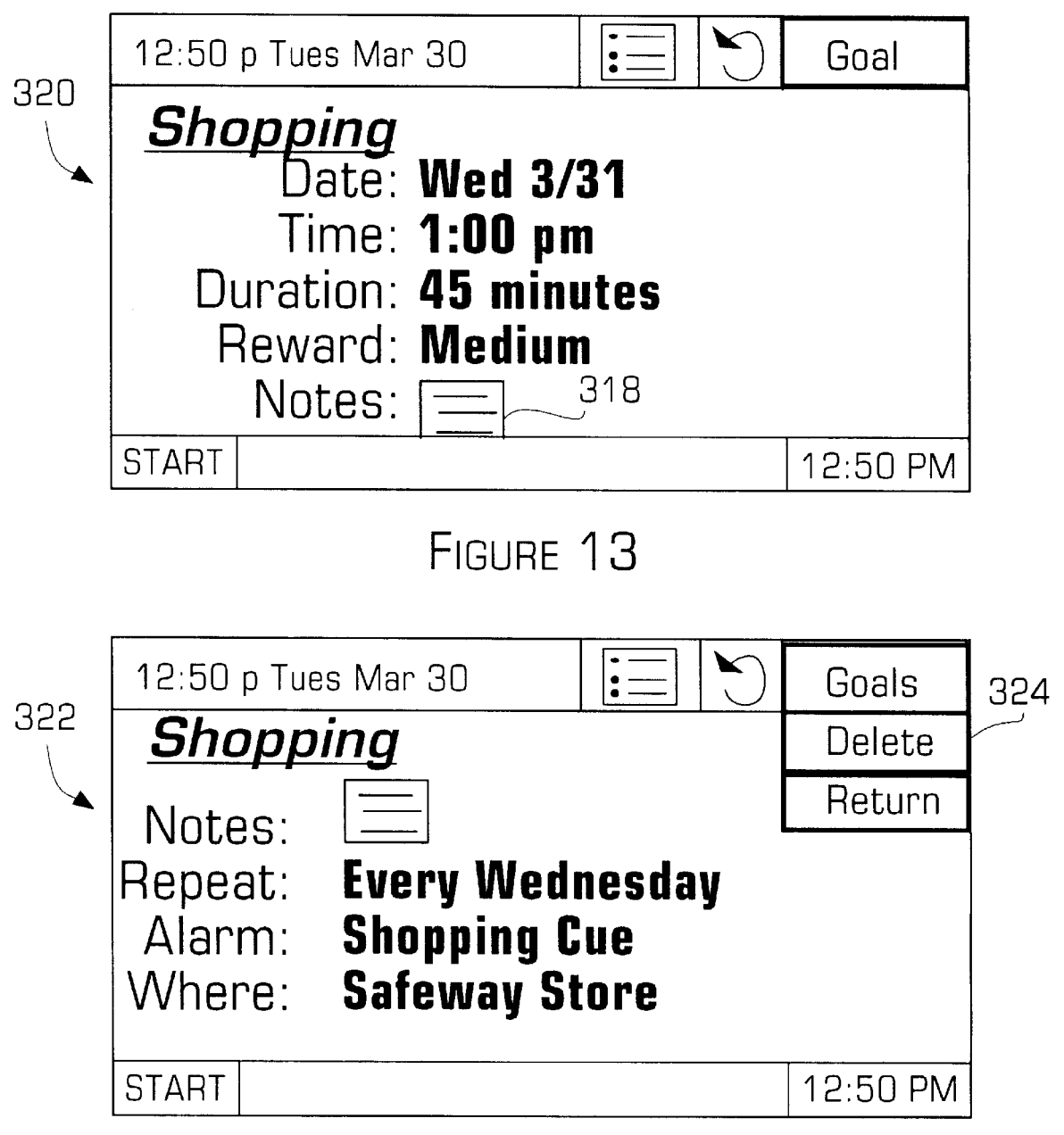

FIG. 12 illustrates a screen 314 displaying a schedule or plan for Tuesday March 30 for a particular user. The plan includes a wake-up script that has been completed as denoted by the check-mark, a lunch task at 11:30 am, a shopping script at 12:30 PM and a class at 1:45 PM for one hour. As above, this screen may also contain a pull-down menu 316 containing additional options for the user. In this particular screen, the menu may permit a user to find a particular goal, enter new goals into the system, or look at today's plan. As shown, the shopping script may have a note 318 associated with it that will be described with reference to FIG. 19. FIG. 13 illustrates a screen 320 displaying the shopping script in more detail including the date, time, duration, reward, and a note 318 relating to the shopping script. Thus, a user may view the details of any script or task displayed by the system. FIG. 14 illustrates a screen 322 displaying more information about the shopping script including the repeat frequency of the script, the alarm time and the location where the script is going to be completed. This screen may have a pull-down menu 324 permitting the user to delete a goal or return to the previous screen.

Figure 15:
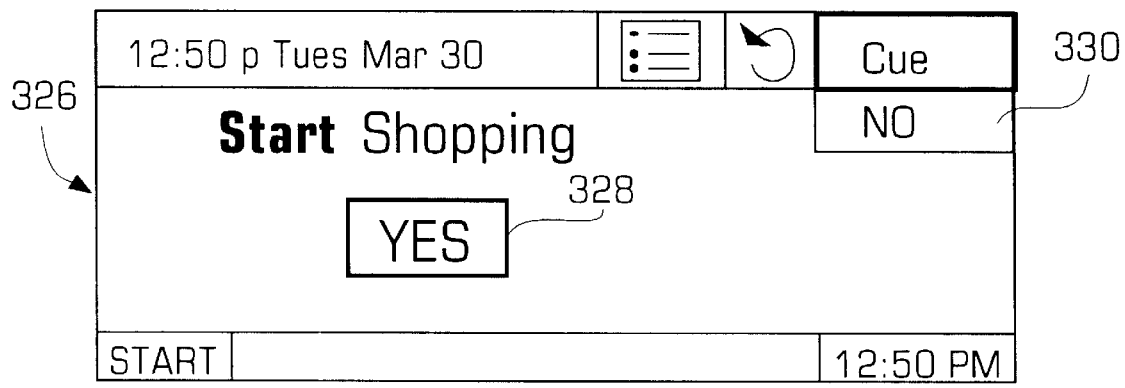
FIG. 15 is a diagram of a screen displaying a cue to start a task.
Figure 16:
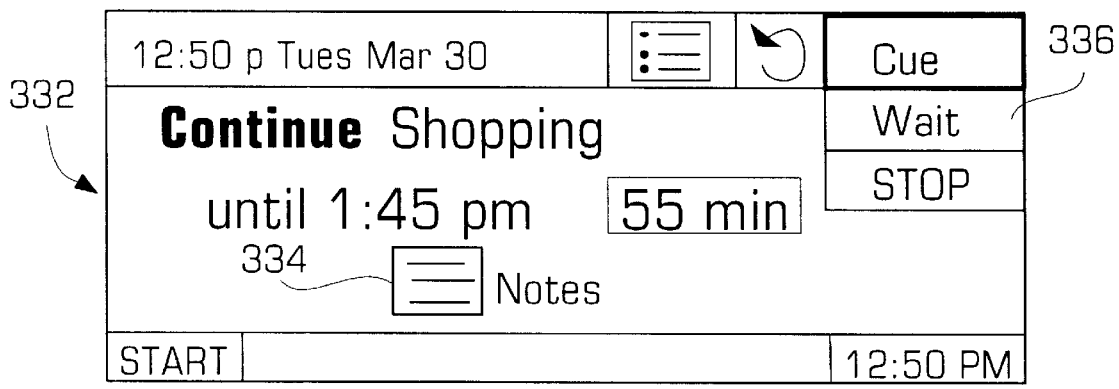
FIG. 16 is a diagram of a screen displaying a cue to continue a task.
Figure 17:
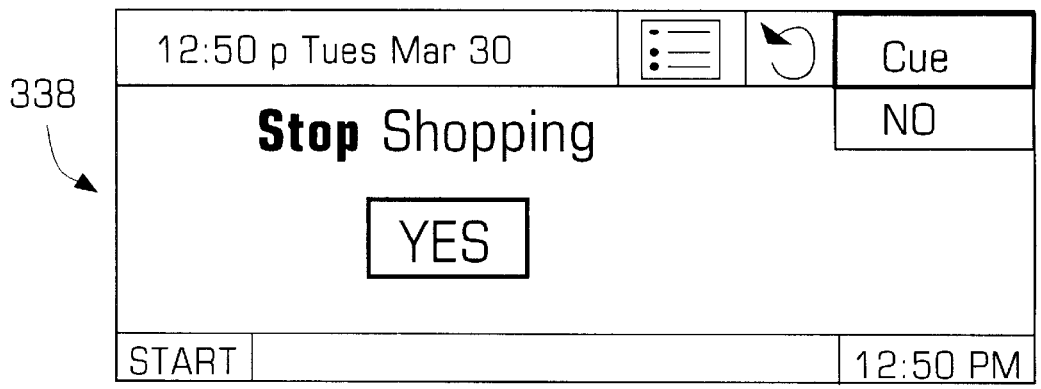
FIG. 17 is a diagram of a screen displaying a cue to stop a task.
Figure 18:
FIG. 18 is a diagram of a screen displaying a cue to continue free time until a next scheduled task.

FIG. 15 illustrates a screen 326 displaying a cue 328 for the user to start shopping. The user may either select "Yes" to begin shopping or "No" in the pull-down menu 330 to delay the starting time of the shopping script in some manner as described above. FIG. 16 illustrates a screen 332 displaying a cue for the user to continue shopping until the end time of the shopping task. As shown, there may be a note 334 attached to this cue. A pull-down menu 336 may permit the user to select to interrupt (wait) or stop the task. FIG. 17 illustrates a screen 338 displaying a cue to stop shopping that may permit the user to either stop shopping or continue shopping. If the user elects to continue shopping, then the system may re-plan the user's schedule based on the new ending time for the shopping. FIG. 18 illustrates a screen 340 displaying a cue that reminds the user that they are currently in a free-time period until the next task is scheduled to start. To start the next task earlier than scheduled, the user may select the "NEXT" button. The screen may also display the next task for the user, such as a class.

Figure 19:
FIG. 19 is a diagram of a screen displaying a note that may be attached to a task.

FIG. 19 illustrates a screen 342 displaying a shopping list note for the user that may be associated with the shopping script and may be displayed by the user. As shown, the user has begun shopping and has already picked up milk, but still needs soup and fruit. Also note that the soup and fruit items each have a note 344, 346 attached to them that may, for example, provide the user with the name of a plurality of particular types of fruit or soup to be purchased. The pull-down menu 348 may permit the user to find other notes, create new notes or return to the previous display.

Figure 20:
FIG. 20 is a diagram illustrating a screen displaying a name index.

FIG. 20 illustrates a screen 350 displaying a portion of the names section. In this example, the names section has been divided into stores and doctors. The user may click on any of these names and view the various data associated with the particular name, such as the address of the store. FIG. 21 illustrates a screen 351 displaying a more detailed portion of the name section. In this particular example, information about the supermarket and directions to the supermarket are shown. The screen may also have a pull-down menu that permits a user to delete a name or return to the previous screen. FIG. 22 illustrates a screen 352 displaying a find operation that permits the user to search for a word or phrase. A pull-down menu 354 may permit the user to select either a word search or a date search or return to the previous screen.

FIGS. 23–25 illustrate a fixed start time appointment, such as a phone call, being inserted within a morning routine script and a choice within the script. In addition, in the event of a surprise, such as the person requiring extra time to shower, the start times of the script tasks may be changed automatically, but the fixed start time appointment embedded within the script does not move. FIG. 23 is a diagram illustrating a screen 356 showing a user's plan which includes a forty-five minute morning routine and a telephone call at 8:05 AM that lasts for ten minutes. FIG. 24 is a diagram illustrating a screen 358 showing the sequence of tasks included within the morning routine script. As shown, the tasks include waking up, using the bathroom, getting dressed and a choice for breakfast meals. As shown, the system may elect either to eat eggs or toast. The choice of eggs or toast may be initially chosen by the system using default user preferences, but may then be changed due to changes in the user's plan. For example, the user may, by default, choose to eat eggs, but on any particular day may require more time to get dressed which reduces the time available for breakfast so that the system will choose that the user eats toast which takes less time to prepare than eggs. Similarly, this may also happen if a user gets an unexpected phone call that delays breakfast by fifteen minutes. FIG. 25 is a diagram of a screen 360 showing the schedule of the user including the tasks of the morning script and the fixed telephone call appointment embedded within the morning script. As described, if an unexpected event occurs and the tasks need to be started later, only the tasks of the morning script are moved and the telephone call remains at 8:05 AM. Thus, the script tasks may move while the fixed telephone call may remain at 8:05 AM so that floating tasks and fixed time tasks may be integrated into a single user plan. Additionally, the sequence of steps within a script may be maintained, so that if one script step is delayed, then the change is propagated so that all subsequent script steps are also delayed. Now, an example of a script of a user and the planning that the system may perform in accordance with the invention will be described.

Now, an illustrative example of the operation of the planning and cueing system in accordance with the invention will be described. A particular user may have a morning script which may include the steps of waking up, getting dressed and eating breakfast that may have a high priority, denoted by the number one, and may last one hour. The user may also have a Tuesday routine/script that may include the morning routine script and various other tasks. Some of those tasks, such as a lunch, a trip to the computer lab, a bus home from school and dinner, are floating events that have an earliest start time and a latest stop time, but also has a duration to complete the task which is less than the time period between the earliest start time and the latest stop time. For example, the computer lab must be completed sometime between noon and four PM and will take ninety minutes. As described above, the planning and cueing system in accordance with the invention may plan these floating events into a user's day and may move the starting or stopping times of these floating events to accommodate changes in the schedule of the user. The user may select for the Tuesday script to be added to the schedule for tomorrow. Thus, the system may receive the Tuesday script and generate a planned schedule based on the script as set forth in Table 1 below.

TABLE 1

| Task/Appointment | Earliest Start Time/ Latest Stop Time | Planned Start/ Stop Time | Priority, Duration if Floating |
|---|---|---|---|
| Morning Routine | 9 am/10 am | 9–10 am | 1 |
| Bus to School | 10:15/10:45 am | 10:15–10:45 am | 3 |
| Class | 11 am/noon | 11–noon | 3 |
| Lunch | noon/2 PM | noon–12:30 PM | 2, 30 mins. |
| Computer Lab * | noon/4 PM | 12:30–2 PM | 3, 90 mins. |
| Bus Home From School | 2 PM/4:30 PM | 2–2:30 PM | 3, 30 mins. |
| Dinner | 5 PM/7 PM | 5–5:30 PM | 1, 30 mins. |

As shown, the floating events have been scheduled into the user's calendar by the planning system and given start and end times within the time period between the earliest start time and the latest stop time. For example, the computer lab has a start time of 12:30 PM and an end time of 2 PM which are within the 12–4:00 PM time period, the * indicates a task which has been shifted and X indicates an task which has been completed. The user may then decide to add another floating task of going to the library tomorrow for thirty minutes, which has a second level of priority and the starting time may occur between noon and 4:00 PM. This additional library task may be added into the Tuesday plan, by the system, as set forth in Table 2.

TABLE 2

| Task/Appointment | Earliest Start Time/ Latest Stop Time | Planned Start/ Stop Time | Priority, Duration if Floating |
|---|---|---|---|
| Morning Routine | 9 am/10 am | 9–10 am | 1 |
| Bus to School | 10:15/10:45 am | 10:15–10:45 am | 3 |
| Class | 11 am/noon | 11–noon | 3 |
| Lunch | noon/2 PM | noon–12:30 PM | 2, 30 mins. |
| Library * | Noon/4 PM | 12:30–1 PM | 2, 30 mins. |
| Computer Lab * | noon/4 PM | 1–2:30 PM | 3, 90 mins. |
| Bus Home From School * | 2 PM/4:30 PM | 2:30–3 PM | 3, 30 mins. |
| Dinner | 5 PM/7 PM | 5–5:30 PM | 1, 30 mins. |

When the library task is added to the plan, the library task has a higher priority than the computer lab so the lab is delayed in favor of the higher priority lab task. As shown, the library task, with priority 2, was added after lunch and then the floating tasks, with priority 3, after lunch were moved to later times as needed. The user may then add the additional floating task of going shopping between two and four PM for 45 minutes with a fourth level of priority. The user may also add a fixed task of seeing a movie from 6:30–8:30 PM with a second level of priority. These tasks may be added as shown in Table 3.

TABLE 3

| Task/Appointment | Earliest Start Time/ Latest Stop Time | Planned Start/ Stop Time | Priority |
|---|---|---|---|
| Morning Routine | 9 am/10 am | 9–10 am | 1 |
| Bus to School | 10:15/10:45 am | 10:15–10:45 am | 3 |
| Class | 11 am/noon | 11–noon | 3 |
| Lunch | noon/2 PM | noon–12:30 PM | 2, 30 mins. |
| Library * | Noon/4 PM | 12:30–1 PM | 2, 30 mins. |
| Computer Lab * | noon/4 PM | 1–2:30 PM | 3, 90 mins. |
| Bus Home From School * | 2 PM/4:30 PM | 2:30–3 PM | 3, 30 mins. |
| Shopping * | 2 PM/4:30 PM | 3–3:45 PM | 4, 45 mins. |

TABLE 3-continued

| Task/Appointment | Earliest Start Time/ Latest Stop Time | Planned Start/ Stop Time | Priority |
|---|---|---|---|
| Dinner | 5 PM/7 PM | 5–5:30 PM | 1, 30 mins. |
| Movie | 6:30/8:30 PM | 6:30–8:30 PM | 2 |

As shown, the shopping task and the movie task was added into the schedule without having to adjust any of the times of the floating events. Now, during the execution of this plan, the user may be cued at noon to start lunch by the system and the user responds with the message, "Wait 15 minutes" because the user wants to talk with friends who unexpectedly appeared. Therefore, the system may adjust the plan based on the user's response as shown in Table 4.

TABLE 4

| Task/Appointment | Earliest Start Time/ Latest Stop Time | Planned Start/ Stop Time | Priority |
|---|---|---|---|
| Morning Routine | 9 am/10 am | 9–10 am | 1 |
| Bus to School | 10:15/10:45 am | 10:15–10:45 am | 3 |
| Class | 11 am/noon | 11–noon | 3 |
| Lunch * | noon/2 PM | 12:15–12:45 PM | 2, 30 mins. |
| Library * | Noon/4 PM | 12:45–1:15 PM | 2, 30 mins. |
| Computer Lab * | noon/4 PM | 1:15–2:45 PM | 3, 90 mins. |
| Bus Home From School * | 2 PM/4:30 PM | 2:45–3:15 PM | 3, 30 mins. |
| Shopping * | 2 PM/4:30 PM | 3:15–4 PM | 4, 45 mins. |
| Dinner | 5 PM/7 PM | 5–5:30 PM | 1, 30 mins. |
| Movie | 6:30/8:30 PM | 6:30–8:30 PM | 2 |

As shown, most of the floating tasks after the lunch were moved back fifteen minutes to account for the user's unexpected talk with his friends. Note that the dinner and movie did not change times since there is still no conflict between the shopping and the dinner. Now, as the user is having lunch, he realizes that he would like an extra fifteen minutes to review some homework. Thus, when the system cues him to stop eating lunch at 12:45 PM, the user may respond with "Wait 15 minutes" and the system may rearrange the user's plan as shown in Table 5.

TABLE 5

| Task/Appointment | Earliest Start Time/ Latest Stop Time | Planned Start/ Stop Time | Priority |
|---|---|---|---|
| Morning Routine X | 9 am/10 am | 9–10 am | 1 |
| Bus to School X | 10:15/10:45 am | 10:15–10:45 am | 3 |
| Class X | 11 am/noon | 11–noon | 3 |
| Lunch * | noon/2 PM | 12:15–1 PM | 2, 45 mins. |
| Library * | Noon/4 PM | 1–1:30 PM | 2, 30 mins. |
| Computer Lab * | noon/4 PM | 1:30–3 PM | 3, 90 mins. |
| Bus Home From School * | 2 PM/4:30 PM | 3–3:30 PM | 3, 30 mins. |
| Shopping * | 2 PM/4:30 PM | 3:30–4:15 PM | 4, 45 mins. |
| Dinner | 5 PM/7 PM | 5–5:30 PM | 1, 30 mins. |
| Movie | 6:30/8:30 PM | 6:30–8:30 PM | 2 |

Now, the lunch task has a duration of 45 minutes and the floating tasks after lunch have been pushed back in time, except for the dinner and movie since no conflict exists. At 1:30 PM, the user realizes, unexpectedly that he will need an additional hour at the library and he will respond to the stop library cue from the system with a "Wait 1 hour" message. The system may then adjust the user's plan as shown in Table 6.

TABLE 6

| Task/Appointment | Earliest Start Time/ Latest Stop Time | Planned Start/ Stop Time | Priority |
|---|---|---|---|
| Morning Routine X | 9 am/10 am | 9–10 am | 1 |
| Bus to School X | 10:15/10:45 am | 10:15–10:45 am | 3 |
| Class X | 11 am/noon | 11–noon | 3 |
| Lunch X | noon/2 PM | 12:15–1 PM | 2, 45 mins. |
| Library X | Noon/4 PM | 1–2:30 PM | 2, 90 mins. |
| Computer Lab * | noon/4 PM | 2:30–4 PM | 3, 90 mins. |
| Bus Home From School * | 2 PM/4:30 PM | 4–4:30 PM | 3, 30 mins. |
| Shopping * (Tentatively Canceled) | 2 PM/4:30 PM | 4:30–5:15 PM | 4, 45 mins. |
| Dinner | 5 PM/7 PM | 5–5:30 PM | 1, 30 mins. |
| Movie | 6:30/8:30 PM | 6:30–8:30 PM | 2 |

As a result of the user's decision to spend an extra hour at the library, as shown by the extended 90 minute duration of the library task, there is a conflict in the schedule since the delay at the library is propagated and pushes the shopping task past its latest stop time (deadline). The system may tentatively cancel the shopping since it has the lowest priority. However, if the user has the capability to plan his schedule, the system may also provide the user with the following choices: 1) reschedule the shopping for tomorrow; 2) decrease the duration of the shopping by fifteen minutes; 3) change the movie start time to at least 5:45 PM; or 4) cancel the movie or dinner tasks. In this example, the user decides to change the movie start time to 6:30 PM and the schedule of the user may be as shown in Table 7.

TABLE 7

| Task/Appointment | Earliest Start Time/ Latest Stop Time | Planned Start/ Stop Time | Priority |
|---|---|---|---|
| Morning Routine X | 9 am/10 am | 9–10 am | 1 |
| Bus to School X | 10:15/10:45 am | 10:15–10:45 am | 3 |
| Class X | 11 am/noon | 11–noon | 3 |
| Lunch X | noon/2 PM | 12:15–1 PM | 2–45 mins. |
| Library X | Noon/4 PM | 1–2:30 PM | 2–90 mins. |
| Computer Lab * | noon/4 PM | 2:30–4 PM | 3–90 mins. |
| Bus Home From School * | 2 PM/4:30 PM | 4–4:30 PM | 3–30 mins. |
| Shopping * | 2 PM/4:40 PM | 4:30–5:15 PM | 4–45 mins. |
| Dinner * | 5 PM/7 PM | 5:15–5:45 PM | 1–30 mins. |
| Movie | 6:30/8:30 PM | 6:30–8:30 PM | 2 |

As shown, the schedule of the user changes based on added tasks, unexpected events and surprises. The system may also automatically adjusts the schedule or ask the user how a conflict within the schedule should be resolved. The system may also reschedule automatically the floating tasks in order to re-plan the schedule based on the changes to the schedule. For a person with a severe cognitive disorder, the system may automatically elect to cancel the shopping, whereas for a businessperson without any disorders, the system may flag the conflict to the user and permit the user to select the change.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. An intelligent planning system for calendars for dynamically detecting and correcting plan errors caused by calendar changes, comprising:

a computer system comprising an input module, a storage module, a planning module and an output module;

said input module further comprising means for receiving a plurality of task descriptions, each task description describing a task to be performed by the user of the system and including fixed tasks and floating tasks, the floating task having a duration that is less than the time period between an earliest start time and a latest stop time, wherein a planned start time of the floating task is determined by said planning module and is within the interval between the earliest start time and the latest stop time of the floating task minus the duration of the floating task;

said storage module further comprises means for receiving said task descriptions from said input module and means for storing a current plan comprising the plurality of task descriptions;

said planning module further comprising means for automatically detecting and correcting errors in the current plan that occur whenever the current plan is modified, the planning module further comprising means for adjusting one or more of the planned start time and the duration of the floating task to correct errors in the current plan; and said output module further comprising means for presenting the current plan information to the user.

2. The system of claim 1, wherein said error detecting and correcting means further comprises means for detecting one or more of interfering tasks, ineffective tasks and irrelevant tasks and means, in response to the detection of these plan errors, for modifying the current plan by one of modifying the task description, adding a new task to the current plan, removing a task from the current plan, replacing a task within the current plan with a new task, and asking the user to select an option to modify the current plan.

3. The intelligent planning system of claim 2, wherein said task description further comprises a plurality of properties about the task comprising an earliest start time, a latest stop time, a duration, a planned start time, and a reward value, the task descriptions including a fixed task and a floating task, the fixed task having a duration equal to the time period between the earliest start time and latest stop time, and the floating task having a duration that is less than the time period between the earliest start time and the latest stop time, wherein the planned start time of said fixed task is the same as the earliest start time of the fixed task and the planned start time of the floating task is determined by said planning module and is within the interval between earliest start time and the latest stop time of the floating task minus the duration of the floating task.

4. The system of claim 3, wherein said error detecting means comprises means for detecting interfering tasks including two or more tasks in the current plan with overlapping intervals between the planned start time and the stop time and tasks that compete for the same resources, means for correcting interfering tasks by shifting the planned start time of a floating task so that the planned times of the tasks no longer overlap or the resource is available; and means for detecting and correcting shifted tasks that are delayed beyond their latest stop times, further comprising means for shifting the planned start time of the task wherein the shifting of the start time may change the sequence of tasks in the current plan.

5. The intelligent planning system of claim 3, wherein said input module further comprises means for receiving condition data that describes the status of dynamic conditions about a task, wherein said storage module further comprises means for receiving said dynamic condition data and said task description further comprising condition data describing conditions that must be true before, during or after a task can be executed, and wherein the error detecting means comprises means for detecting ineffective tasks comprising means for detecting tasks with conditions that are not true, and wherein said error correction means further comprises means for correcting ineffective tasks by one of adding new tasks to the current plan to achieve said conditions, and one of replacing the ineffective task in said current plan with a new task, removing the ineffective task from the current plan and reordering the current plan.

6. The intelligent planning system of claim 3, wherein the task description further comprises data describing one or more prerequisite tasks that must be completed before the task can be executed, and wherein said means for error detecting further comprising means for detecting ineffective tasks which comprises means for detecting tasks that are not preceded by the prerequisite tasks in said current plan and means for correcting ineffective tasks comprising means for adding said prerequisite tasks into said current plan, means for replacing the ineffective task in said current plan, means for removing the ineffective task from the current plan and means for reordering the tasks in the current plan.

7. The intelligent planning system of claim 3, wherein said reward for each task description further comprises one or more metrics including task priority and task score.

8. The intelligent planning system of claim 1, wherein the output module further comprises cueing means for reminding a user when to start and stop tasks according to the current plan, wherein the input module further comprises means for receiving a cue response from the user in response to the cueing means, wherein said cue response may override said current plan, and wherein said planning module further comprises means for automatically detecting and correcting plan errors caused by said cue overrides.

9. The system of claim 8, wherein said planning module further comprises means for automatically detecting and correcting errors in the current plan caused by the cue override in real-time before, during and after cueing the user to start and stop each step in said current plan.

10. The intelligent planning system of claim 1, wherein said planning module further comprises means for generating one or more competing plan variations each having a modification to the current plan including one or more of different planned start time, different duration, different latest stop time, different priority, and adding and replacing different tasks and different resources, means for determining a reward value for each plan variation, means for selecting a plan variation with the highest determined reward value, and means for updating said current plan with the selected plan variation.

11. The intelligent planning system of claim 1, wherein said task comprises a script including a programmed sequence of fixed tasks, floating tasks, and other scripts.

12. The intelligent planning system of claim 11, wherein said input module further comprises means for receiving condition data that describes the status of dynamic conditions about a task and wherein said script includes conditional and iterative control statements whereby a different sequence of tasks within the script will be executed depending on the value of the condition data.

13. The intelligent planning system of claim 11, wherein said scripts further comprise choice control statements that describe a plurality of choices for resources and tasks whereby different resources or tasks will be used within said script depending on the choice that is selected by the planning module.

14. The intelligent planning system of claim 12, wherein said scripts further comprise condition tests that determine the truth of conditions whereby the current plan fails if the condition fails.

15. The system of claim 1, wherein said planning module further comprises means for simulating the execution of the current plan to generate simulated plan outcomes, means for detecting and correcting errors in the current plan by analyzing the simulated plan outcomes, and means for updating said current plan based on the selected plan variation.

16. The intelligent planning system of claim 1, wherein said planning module further comprises means for simulating the execution of one or more plan variations of the current plan to generate simulated plan outcomes and reward values for each plan variation, means for detecting and correcting errors in the plan variations by analyzing the simulated plan outcomes for different plan variations, means for selecting the plan variation with the highest reward value, and means for updating said current plan with the selected plan variation.

17. The intelligent planning system of claim 1, wherein the output module further comprises an execution module and wherein said input module further comprising means for receiving a goal list;

said storage module further comprising means for receiving said goal list from said input module to generate a current plan having one or more tasks;

said planning module further comprising means for automatically detecting and correcting errors in the current plan that may occur whenever a plan trigger event occurs and means for generating plan rules that describe when to start and stop each task in the current plan, said plan rules comprising an antecedent clause describing the antecedent conditions necessary to start and stop a task and a consequent clause identifying the action to be taken, each plan rule directing the execution module to start, stop, or modify a task when said antecedent conditions are true; and said execution module comprising means for starting and stopping a task according to said plan rules by presenting cues to the user to start and stop goals when the antecedent clause or a plan rule is true, and means for receiving a plurality of cue responses from the user, the cue responses overriding the current plan by causing a plan trigger event.

18. The intelligent planning system of claim 17 further comprising a script library containing a plurality of scripts, each script comprising a programmed sequence of one or more tasks and scripts, wherein said planning module further comprises means for executing said scripts by executing the programmed sequence of one or more tasks and scripts.

19. The intelligent planning system of claim 18, wherein said input module further comprises means for receiving condition data that describes the status of dynamic conditions about a task, the dynamic condition describing conditions which are not known at the time of the creation of the current plan and wherein said scripts further comprise one of conditional and iterative control branches of task sequences within in the script whereby a different sequence of tasks within the script will be executed depending on the value of the condition data.

20. The intelligent planning system of claim 17, wherein said scripts further comprise condition tests that determine the truth of conditions whereby the current plan fails if the condition fails.

21. The intelligent planning system of claim 17, wherein said scripts further comprise a choice point comprising a set of competing choices for resources or tasks to be used within a script such that one resource or task must be selected from the choice set before the next step in the script can be executed, the consequent clause of the plan rule further directing the execution module to choose the resources or tasks selected by the planning module.

22. The intelligent planning system of claim 17, wherein said input module further comprises means for receiving condition data that describes the status of dynamic conditions about a task, the dynamic condition describing conditions which are not known at the time of the creation of the current plan, wherein the plan trigger events further comprise a goal changed event, a condition changed event, a deadline near event and an execution failure event, said input module further comprising means for detecting a changed goal and for sending a goal-changed message to said plan module when the user has changed the goal list and means for detecting a changed condition event and for sending a condition-changed message to said plan module when a condition changes, and said execution module further comprising means for detecting a changed condition and for sending a condition-changed message to said plan module, means for detecting an approaching deadline and for sending a deadline-near message to said plan module, and means for detecting that a task has failed if a condition fails prior, during or after execution and for sending an execution failure message to said plan module.

23. The intelligent planning system of claim 17, wherein said planning module further comprises means for simulating the execution of the current plan and a plurality of plan variations in the simulation mode to generate simulated plan variation outcomes including a reward value, each plan variation having one or more modifications to the current plan including different actual start time, different duration, different latest stop time, different priority, and adding and replacing different tasks and different resources, means for detecting and correcting errors in the plan variations by analyzing the simulated plan variation outcomes for different plan variations, means for selecting the plan variation with the highest expected reward value, and means to update said current plan with the selected plan variation.

24. The intelligent planning system of claim 17, wherein the plan error detection means further comprises means for detecting one or more of interfering goals, ineffective goals and irrelevant goals and means, in response to the detection of these plan errors, for changing the plan rules that comprises one of modifying the goal description, adding a new goal to the current plan, removing a goal from the current plan, replacing a goal within the current plan with a new goal and asking the user to select the option to modify the current plan.

25. The intelligent planning system of claim 24, wherein said task description further comprises a plurality of goal properties including an earliest start time, a latest stop time, a duration, a planned start time, and a reward value, the task descriptions including a fixed task and a floating task, the fixed task having a duration equal to the time period between the earliest start time and latest stop time and the floating task having a duration equal to less than the time period between the earliest start time and the latest stop time, wherein the planned start time of said fixed task is the same as the earliest start time of the fixed task and the planned start time of the floating task is determined by said planning module and is within the interval between earliest start time and the latest stop time of the floating task minus the duration of the floating task.

26. The intelligent system of claim 24, wherein said means for detecting interfering goals includes two or more goals in the current plan with overlapping intervals between the planned start time and the stop time and goals competing for the same resource, means for correcting interfering goals by shifting the planned start time of a floating goal so that the start and stop times of the goals no longer overlap or the competing resource is available, means for detecting and correcting shifted goals that are delayed beyond their latest stop times, and further comprising means for shifting the start time of the goal wherein the shifting of the start time changes the sequence of goals in the current plan.

27. The intelligent planning system of claim 24, wherein said input module further comprises means for receiving condition data that describes the status of dynamic conditions about a goal, wherein said storage module further comprises means for receiving said dynamic condition data and said goal description further comprising condition data describing conditions that must be true before, after or during a goal can be achieved, and wherein the means for detecting ineffective goals comprises means for detecting goals with conditions that are not true prior or after execution of the goal and goals that are not preceded by its preconditions, and wherein said means for correcting ineffective goals comprising one of adding new goals to the current plan to achieve said conditions and replacing the ineffective goal in said current plan with a new goal.

28. The intelligent planning system of claim 24, wherein the task description further comprises data describing one or more prerequisite goals that must be completed before the goal can be executed, and wherein said means for detecting ineffective goals comprises means for detecting goals in the plan that are not preceded by the prerequisite goals in said current plan and means for correcting ineffective goals comprising means for adding said prerequisite goals into said current plan, means for replacing the ineffective goal in said current plan, means for removing the ineffective goal from the current plan and means for reordering the goals in the current plan.

29. An intelligent planning system for dynamically detecting and correcting plan errors caused by calendar changes, comprising:

means for receiving a plurality of task descriptions, each task description describing a task to be performed by the user of the system and further comprising a plurality of properties about the task comprising an earliest start time, a latest stop time, a duration, a planned start time, and a reward value, the task descriptions including a fixed task and a floating task, the fixed task having a duration equal to the time period between the earliest start time and latest stop time, and the floating task having a duration that is less than the time period between the earliest start time and the latest stop time, wherein the planned start time of said fixed task is the same as the earliest start time of the fixed task and the planned start time of the floating task is within the interval between earliest start time and the latest stop time of the floating task minus the duration of the floating task;

means for generating a current plan comprising the plurality of task descriptions, the current plan including fixed and floating tasks;

means for automatically detecting and correcting errors in the current plan, the error correcting means further comprising means for changing one or more of the planned start time and the duration of the floating task so that it is still between the earliest start time and the latest stop time in order to correct the plan; and means for presenting the current plan information to the user.

\* \* \* \* \*